United States Patent [19]
Kanto et al.

[11] Patent Number: 5,998,556
[45] Date of Patent: Dec. 7, 1999

[54] RAW MATERIAL USED FOR PRODUCING HEAT-RESISTANT RESINS, HEAT-RESISTANT RESINS, AND PROCESS FOR PRODUCING HEAT-RESISTANT RESINS

[75] Inventors: Teruyuki Kanto; Kenichi Ueda, both of Himeji; Kazumi Fujioka, Ibo-gun; Kazuo Kishino, Himeji, all of Japan

[73] Assignee: Nippon Shokubai Co., Ltd., Osaka, Japan

[21] Appl. No.: 08/836,816

[22] PCT Filed: Sep. 25, 1996

[86] PCT No.: PCT/JP96/02763

§ 371 Date: May 20, 1997

§ 102(e) Date: May 20, 1997

[87] PCT Pub. No.: WO97/11978

PCT Pub. Date: Apr. 3, 1997

[30] Foreign Application Priority Data

Sep. 27, 1995 [JP] Japan .................................. 7-249277
Jul. 31, 1996 [JP] Japan .................................. 8-202445

[51] Int. Cl.⁶ ........................ C08F 226/06; C08F 222/04
[52] U.S. Cl. ........................ 526/262; 526/318.2
[58] Field of Search ................... 526/262, 318.2

[56] References Cited

U.S. PATENT DOCUMENTS

| | | | |
|---|---|---|---|
| 5,073,615 | 12/1991 | Shen | 526/262 |
| 5,319,043 | 6/1994 | Shen | 526/262 |
| 5,328,962 | 7/1994 | Shen | 525/228 |
| 5,556,991 | 9/1996 | Kita et al. | 548/548 |

FOREIGN PATENT DOCUMENTS

| | | |
|---|---|---|
| 43-9753 | 4/1968 | Japan . |
| 59-122536 | 7/1984 | Japan . |
| 61-252211 | 11/1986 | Japan . |
| 62-109811 | 5/1987 | Japan . |
| 62-112612 | 5/1987 | Japan . |
| 62-156115 | 7/1987 | Japan . |
| 62-177009 | 8/1987 | Japan . |
| 62-234063 | 10/1987 | Japan . |
| 63-081151 | 4/1988 | Japan . |
| 63-304013 | 12/1988 | Japan . |
| 63-304045 | 12/1988 | Japan . |
| 63-316767 | 12/1988 | Japan . |
| 64-62315 | 3/1989 | Japan . |
| 1-186901 | 7/1989 | Japan . |
| 1-256551 | 10/1989 | Japan . |
| 1-308413 | 12/1989 | Japan . |
| 3-170515 | 7/1991 | Japan . |
| 4-72302 | 3/1992 | Japan . |
| 4-145149 | 5/1992 | Japan . |
| 5-086105 | 4/1993 | Japan . |
| 5-86105 | 4/1993 | Japan . |
| 5-201972 | 8/1993 | Japan . |
| 5-221974 | 8/1993 | Japan . |
| 5-247145 | 9/1993 | Japan . |
| 5-310843 | 11/1993 | Japan . |
| 5-310853 | 11/1993 | Japan . |
| 6-041249 | 2/1994 | Japan . |
| 6-41249 | 2/1994 | Japan . |
| 6-116331 | 4/1994 | Japan . |
| 6-135931 | 5/1994 | Japan . |
| 6-88971 | 11/1994 | Japan . |
| 8-106018 | 4/1996 | Japan . |
| WO 93/03076 | 2/1993 | WIPO . |

*Primary Examiner*—Jeffrey T. Smith
*Assistant Examiner*—W C Cheng
*Attorney, Agent, or Firm*—Kubovcik & Kubovcik

[57] ABSTRACT

N-Cyclohexylmaleimide having a cyclohexylaminosuccinic anhydride content of 0.001 to 1 wt. % is used as the main raw material for the production of heat-resistant resins. The resins are produced by a process of copolymerizing the above material with at least one monomer copolymerizable therewith which is characterized by the use of a monomer having a low yellowness, the addition of a compound which can inhibit the evaporation of the non-radical compounds contained in the monomer through reactions, the addition of an antioxidant, the use of a solvent containing alcohol, or the presence of a non-radical-polymerizable acid anhydride or carboxylic acid. The heat-resistant resins produced by the use of the above raw material or the above process are excellent in transparency, i.e., less discolorable, even when an increased amount of N-cyclohexylmaleimide is used for the purpose of imparting more excellent heat resistance. Accordingly, the heat-resistant resins can be suitably used in the fields necessitating both a low discolorability and a high heat resistance.

24 Claims, 1 Drawing Sheet

RAW MATERIAL USED FOR PRODUCING HEAT-RESISTANT RESINS, HEAT-RESISTANT RESINS, AND PROCESS FOR PRODUCING HEAT-RESISTANT RESINS

TECHNICAL FIELD

The present invention relates to a raw material used for producing heat-resistant resins, heat-resistant resins which are produced from the raw material and have excellent heat resistance, fine appearance and a low coloring factor, and a process for producing the heat-resistant resins.

BACKGROUND ART

Methacrylic resins made from methyl methacrylate as a principal component have excellent weatherproof and optical properties, and relatively balanced mechanical, thermal and fabrication properties. The methacrylic resins are used in various fields, such as automobile parts, electrical equipment parts, face plates, signs, covers for lights, ornaments, and variety goods, because of their properties mentioned above.

However, the methacrylic resins are insufficient in terms of heat resistance, and therefore their use in the fields requiring shape stability at high temperatures is limited. Thus, there is a strong demand for an improvement of the heat resistance of the methacrylic resins.

Many methods have been proposed for improving the heat resistance of the methacrylic resins. Examples of the proposed methods include the copolymerization of methyl methacrylate and N-aryl maleimide (Japanese Publication for Examined Patent Application, No. 9753/1968), and blending the copolymer of methyl methacrylate, α-methyl styrene and maleic anhydride with a methyl methacrylate copolymer (Japanese Publication for Unexamined Patent Application, No. 122536/1984).

Moreover, as known methods for producing transparent methacrylic resins of improved heat resistance and reduced coloring factor, there are methods including copolymerizing methyl methacrylate and N-cyclohexylmaleimide within a specific range (Japanese Publication for Unexamined Patent Application, No. 156115/1987 and 177009/1987), and a method including copolymerizing methyl methacrylate and N-cyclohexyl maleimide and then reducing raw material monomers remaining in the resultant copolymer (Japanese Publication for Unexamined Patent Application, No. 112612/1987).

By copolymerizing a methacrylic ester such as methyl methacrylate and N-substituted maleimide such as N-cyclohexylmaleimide, it is possible to achieve some improvements in respect of the heat resistance, transparency, and coloring factor, thereby providing a transparent heat-resistant resin for optical uses.

However, in such a heat-resistant resin, the improvement of the heat resistance depends on the amount of N-substituted maleimide. Therefore, in order to obtain a heat-resistant resin of improved heat-resistance, it is necessary to increase the N-substituted maleimide unit in the heat-resistant resin. However, the increase of the N-substituted maleimide unit causes a problem that the resultant heat-resistant resin tends to color (yellow).

In the case of N-substituted maleimide-based heat-resistant resins produced from N-substituted maleimide as one of the raw materials, the coloration of resin products is generally known. However, some uses of the resin products strongly require a reduction in the coloration of the resin products. Thus, there has been a demand for the development of N-substituted maleimide-based heat-resistant resins of reduced coloration (referred to as "low coloring factor" in the present invention).

In the production of molded articles by molding the heat-resistant resins obtained by the above-mentioned methods, the molded articles sometimes had lowered surface smoothness, and showed deterioration in their optical properties including transparency, and appearance.

The present inventor studied to find the cause of the lowering of the smoothness, and discovered that non-polymerizable impurities derived from the raw material in producing the N-substituted maleimide were the causes of such a lowering of the smoothness.

Since most of such impurities have their melting points at temperatures lower than 200° C., when a heat-resistant resin containing the impurities is molded, the impurities volatilize due to heat in molding, and adhere to the mold surfaces. As a result, the smoothness of the mold surfaces is impaired. The impairing of the smoothness of the mold surfaces deteriorates the smoothness of the surface of the molded article obtained by the molding, and worsens the appearance and transparency of the molded article.

It was also discovered by the present inventor that such impurities adhere to an air pressure-reducing line and adhere as gum to an outlet of the heat-resistant resin in the process of producing a heat-resistant resin by copolymerizing the N-substituted maleimide and a monomer components containing, for example, methacrylic ester as a principal component, for example, in the solvent removing step of removing a solvent, etc. under conditions of heat and reduced pressure by an extruder, a flash tank, etc. after solution polymerization. Such adhesion of impurities may prevent stable production of heat-resistant resins.

Examples of the impurities are non-radical polymerizable compounds having a functional group, such as carboxyl group, acid anhydride group, primary amino group and secondary amino group. According to Japanese Publication for Unexamined Patent Applications, No. 221974/1993, 201972/1993, and 135931/1994, when the resultant N-substituted maleimide is stored, these impurities cause a change in the color of the N-substituted maleimide with time. These publications also disclose the inclusion of another purifying step like water treatment in the production steps as a method for reducing the impurities.

However, the conventional method disclosed in the above-mentioned publications can not easily eliminate disadvantages of the resultant heat-resistant resin and the production thereof which are caused by the impurities. The reason for such disadvantages is that this method additionally requires a special purifying step like water treatment in order to reduce the impurities, or has difficulty in reducing the impurities depending on the type of N-substituted maleimide.

In the case where an increase in the heat-resistance of the resultant heat-resistant resin is required, it is necessary to increase the amount of N-substituted maleimide units. However, if a monomer mixture containing a large amount of N-substituted maleimide is polymerized, the heat-resistant resin tends to color during polymerization and heating in the molding process. Consequently, it is difficult to obtain heat-resistant resins of low coloring factors.

Therefore, the use of antioxidant such as a phosphorus-based antioxidant and a phenol-based antioxidant was proposed as a method for reducing the coloring factor of a heat-resistant resin containing a large amount of N-substituted maleimide units in heating.

For example, Japanese Publication for Unexamined Patent Application, No. 256551/1989 discloses a method for producing a styrene-methyl methacrylate-based resin composition by mixing a thioether-based organic sulfur stabilizer and a phosphite compound with a styrene-methyl methacrylate-based resin obtained by polymerizing monomer components containing methyl methacrylate, styrene and a maleimide compound, and further mixing a bisphenol-based antioxidant with the styrene-methyl methacrylate-based resin, if desired, for the purpose of improving the thermal stability.

On the other hand, Japanese Publication for Unexamined Patent Application, No. 304045/1988 discloses the addition of an organic phosphorus-based compound to a methacrylate-based polymer obtained by copolymerizing methyl methacrylate and a maleimide compound as a method for producing a methacrylate-based resin composition of improved heat decomposition resistance. Additionally, this publication discloses the addition of an organic sulfur-based compound to the methacrylate-based polymer, and the addition of an organic sulfur-based compound as a chain transfer agent during polymerization based on the above-mentioned method.

Japanese Publication for Unexamined Patent Application, No. 116331/1994 discloses a method for producing a transparent heat-resistance resin by polymerizing a composition formed by adding a phosphorus-based compound to a monomer mixture containing N-substituted maleimide for the purpose of reducing yellowing in the heating step.

Thus, the above-mentioned publications describe the use of antioxidants, such as phosphorous-based compound and phenol-based compound, to achieve improvements in respect of the thermal stability and coloring factor.

However, in the methods disclosed in Japanese Publication for Unexamined Patent Application, No. 256551/1989 and 304045/1988 above, since the antioxidant is not added during polymerization, i.e., the antioxidant is all added after the completion of the polymerization, the effect on a coloring source produced during the polymerization may not be fully exhibited.

Furthermore, in the method disclosed in Japanese Publication for Unexamined Patent Application, No. 116331/1994 above, since the antioxidant is all added to the monomer mixture and then cast polymerization is performed, the polymerization of the monomer mixture is interfered by the antioxidant, and the conversion rate of the monomers to polymer may be lowered. Namely, the methods disclosed in the above-mentioned publications suffer from the problems that the efficiency of producing heat-resistant resins is low, and the heat-resistant resins tend to color more easily.

In the method disclosed in Japanese Publication for Unexamined Patent Application, No. 304045/1988, even when the organic sulfur-based compound as the chain transfer agent is added during polymerization, a sufficient coloration reducing effect is not produced in the polymerization.

In addition, for example, the following publications propose a method for reducing the coloration of heat-resistant resins containing N-substituted maleimide units during polymerization and molding. Japanese Publication for Unexamined Patent Application, No. 252211/1986 proposes reducing the residual maleimide by washing polymer beads obtained by suspension polymerization with an alcohol having 1 to 4 carbons. Japanese Publication for Unexamined Patent Application, No. 304013/1988 proposes polymerization using a specific initiator. Japanese Publication for Unexamined Patent Application, No. 310853/1993 proposes performing cast polymerization by adding a benzyl alcohol or substituted benzyl alcohol to the monomer mixture.

However, these conventional methods suffer from the problems that the number of production steps is increased, and the coloration reducing effect is not sufficient. The method disclosed in Japanese Publication for Unexamined Patent Application, No. 310853/1993 is cast polymerization, and alcohol is not removed. In this method, if a large quantity of alcohol is used, a lowering of the heat resistance and the expansion of the heat-resistant resin in heating tend to occur due to the alcohol remaining in the resin. Thus, there is a possibility of impairing the appearance. Consequently, in this method, the amount of alcohol to be added is limited to a small amount not greater than 1 percent by weight of the total amount of monomers, for example, 0.5 percent by weight. As a result, a sufficient coloration reducing effect is not exhibited.

As a method for reducing the coloration of heat-resistant resins containing N-substituted maleimide units during polymerization or molding, Japanese Publication for Unexamined Patent Application No. 234063/1987 discloses heat stabilization of N-cyclohexyl maleimide by adding maleamic acid, etc. to the N-cyclohexyl maleimide. In this method, suspension copolymerization of N-cyclohexyl maleimide and vinyl chloride is performed to produce a copolymer of a reduced coloring factor.

However, in this conventional method, since the N-cyclohexyl maleimide to which the maleamic acid is added is copolymerized, a radical polymerization (polymerization reaction) of radical polymerizable maleamic acid and monomers of N-cyclohexyl maleimide, etc. proceeds. This may impair the transparency and heat-resistance of the resultant heat-resistant resin.

It is an object of the present invention to provide a raw material used for producing heat-resistant resins of a low coloring factor, more particularly an N-substituted maleimide-based heat-resistant resin having excellent heat resistance, fine appearance including transparency, and a lower coloring factor.

It is another object of the present invention to provide a heat-resistant resin produced from the above-mentioned raw material, more particularly an N-substituted maleimide-based heat-resistant resin having excellent heat resistance, fine appearance including transparency, and a lower coloring factor, and to provide a process for producing such a heat-resistant resin.

It is still another object of the present invention to provide a process for stably and simply producing a heat-resistant resin having excellent transparency, heat resistance, and a low coloring factor.

DISCLOSURE OF THE INVENTION

The present inventor studied the coloration of N-cyclohexyl maleimide-based heat-resistant resins, and discovered that cyclohexylamino succinic anhydride which is present as an impurity in N-cyclohexyl maleimide as a raw material is a causative agent of coloration. The present invention was completed based on this discovery.

More specifically, the raw material used for producing heat-resistant resins of the present invention contains N-cyclohexyl maleimide as a principal component, and the content of cyclohexylamino succinic anhydride is in the range from 0.001 to 1 weight percent (based on the N-cyclohexyl maleimide).

The heat-resistant resin of the present invention is obtained by copolymerizing the above-mentioned raw material with at least one kind of monomer copolymerizable with the raw material. The yellowness (YI) of the heat-resistant resin is not higher than 2, or the yellowness (YIso1.) thereof in a solution is not higher than 3, preferably not higher than 2.

The following description will discuss the present invention in detail.

The raw material used for producing the heat-resistant resin of the present invention contains N-cyclohexyl maleimide as a principal component, and the content of cyclohexylamino succinic anhydride is adjusted in the range from 0.001 to 1 weight percent (based on the N-cyclohexyl maleimide), more preferably in the range from 0.01 to 0.5 weight percent.

The heat-resistant resin of the present invention is obtained by copolymerizing the above-mentioned raw material with at least one kind of monomer copolymerizable with the raw material. The yellowness (YI) of the heat-resistant resin is not higher than 2, or the yellowness (YIso1.) thereof in a solution is not higher than 3, preferably not higher than 2.

The N-cyclohexyl maleimide is a known substance, and the production method thereof is also well known. More specifically, N-cyclohexyl maleimide is easily obtained by the ring closure of N-cyclohexylmaleamic acid obtained by reacying, for example, maleic anhydride with cyclohexl amine.

However, it has not been known that the N-cyclohexyl maleimide thus obtained contains cyclohexylamino succinic anhydride as an impurity. Moreover, it was first discovered by the present inventor that the cyclohexylamino succinic anhydride is a causative agent of coloration of the N-cyclohexyl maleimide-based heat-resistant resin. The N-cyclohexylamino succinic anhydride is represented by general formula (1) below, and would be product in producing N-cyclohexyl maleimide.

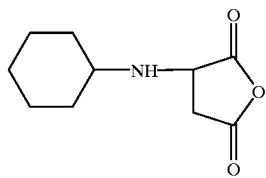

(1)

When the cyclohexylamino succinic anhydride content exceeds 1 weight percent, the resultant N-cyclohexyl maleimide-based heat-resistant resin colors (see Comparative Examples 1 and 2). On the other hand, even when the cyclohexylamino succinic anhydride content is reduced to a value less than 0.001 weight percent, the reduction in coloration corresponding to the reduction in the cyclohexylamino succinic anhydride content is not observed. Considering the cost of distillation for removing the cyclohexylamino succinic anhydride, it is desirable to set the minimum content of the cyclohexylamino succinic anhydride to 0.001 weight percent.

A raw material containing cyclohexylamino succinic anhydride in an amount ranging from 0.001 to 1 weight percent is easily obtained by distilling a raw material containing crude N-cyclohexyl maleimide as a principal component after the completion of reaction and recrystallizing the raw material using a solvent like acetone, or repeating these processes.

In the present invention, the cyclohexylamino succinic content was measured as follows.

Cyclohexylamino Succinic Anhydride Content

The cyclohexylamino succinic anhydride content was measured using a high-speed chromatography (LC-10A) of Shimadzu Corporation according to the method explained in the Example section given later.

In the present invention, the term "heat-resistant resin" refers to a resin which is produced from the above-mentioned raw material, has a glass transition temperature of not lower than 120° C., and yellowness (YI) of not higher than 2 or yellowness in solution (YIso1.) of not higher than 3, preferably not higher than 2, more preferably not higher than 1 when measured by the methods described below.

Measurement of Glass Transition Temperature

The glass transition temperature of the resultant copolymer was calculated from the midpoint of a DSC (differential scanning calorimetry) curve measured under atmosphere of nitrogen gas from room temperature to 220° C. at a heating rate of 10° C. per minute using α-alumina as a reference by a differential scanning calorimeter (DSC-8230 of Rigaku Denki K.K.) according to JIS(Japanese Industrial Standards)-K-7121.

Yellownesses (YI and YIsol.)

The yellowness (YI) of a 3.0-mm thick polymer plate formed by the heat-resistant resin of the present invention by the cast polymerization described in Example 1 given below, and of a 3.0-mm thick copolymer molded article produced from the heat-resistant resin by the method described in Example 3 below were measured using a color difference meter (Σ80 of Nippon Denshoku Kogyo) according to JIS-K-7103.

15 weight percent of chloroform solution of a copolymer pellet produced from the heat-resistant resin of the present invention by the method described in Example 3 below was prepared. The chloroform solution was placed on a 10-mm thick glass cell, and its tristimulus values were measured using transmitted light according to JIS-K-7103. The yellowness (YIsol.) in solution was measured based on the tristimulus values.

Examples of monomers which are copolymerizable with the raw material containing N-cyclohexyl maleimide as a principal component used for producing heat-resistant resins of a low coloring factor of the present invention include methacrylic esters, such as methyl methacrylate; acrylic esters such as methyl acrylate; and aromatic vinyl compounds such as styrene and α-methyl styrene. The methyl methacrylate, methyl acrylate, styrene, α-methyl styrene are particularly suitable because they have excellent reactivity and give resins of high heat resistance.

Preferred methacrylic esters are those having either an alkyl group, cyclohexyl group or benzyl group containing 1 to 18 carbons. Examples of such methacrylic esters include methyl methacrylate, ethyl methacrylate, propyl methacrylate, isopropyl methacrylate, butyl methacrylate, isobutyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, 2-phenoxyethyl methacrylate, 3-phenylpropyl methacrylate, and 2-hydroxyethyl methacrylate. Among these compounds, the methyl methacrylate is particularly preferred. It is possible to use only one kind or a combination of more than one kind of such methacrylic esters.

One of the heat-resistant resins with a low coloring factor of the present invention is a bicomponents-copolymer of the above-mentioned raw material and copolymerizable monomer. Typical examples of such a bicomponents-copolymer include the copolymer of the raw material and methyl methacrylate, the copolymer of the raw material and cyclohexyl methacrylate, and the copolymer of the raw material and isobornyl methacrylate.

The polymerization of such bicomponents-copolymers is not particularly limited in its method, and can be performed according to a conventional known method. For example, when copolymerizing the raw material and methyl methacrylate, a radical polymerization of 5 to 50 weight parts of the raw material and 95 to 50 weight parts of methyl methacrylate (100 weight parts in total) is performed using a radical polymerization initiator to be described later by the conventional procedure.

As another heat-resistant resin with a low coloring factor of the present invention, a tricomponents-copolymer or polycomponents-copolymer obtained by copolymerizing the raw material, methacrylic ester (particularly, methyl methacrylate), and at least one kind of monomer selected from the above-mentioned copolymerizable monomers.

Typical examples thereof include the copolymer of the raw material, methyl methacrylate and α-methyl styrene, the copolymer of the raw material, methyl methacrylate and styrene, and the copolymer of the raw material, methyl methacrylate and methyl acrylate.

Like the polymerization of bicomponents-copolymer, the polymerization of such a tricomponents- or polycomponents-copolymer is not particularly limited in its method, and can be performed by a conventional method. For example, in the case of the copolymer of the raw material, methyl methacrylate and styrene, a radical polymerization of 5 to 50 weight parts of the raw material, 95 to 50 weight parts of methyl methacrylate, styrene in an amount of not higher than 30 weight parts based on 100 weight parts in total of the raw material and methyl methacrylate is performed using a radical polymerization initiator to be described later according to the conventional procedure.

Another process for producing a heat-resistant resin of the present invention is characterized by copolymerizing a maleimide-based monomer (maleimide-based polymerizable monomer) whose yellowness in solution is not higher than 1.0 and a polymerizable monomer which is copolymerizable with the maleimide-based monomer.

Examples of such a maleimide-based monomer include N-cyclohexyl maleimide, N-phenyl maleimide, N-methyl maleimide, N-ethyl maleimide, N-isopropyl maleimide, N-t-butyl maleimide, N-tribromophenyl maleimide, N-lauryl maleimide, and N-benzyl maleimide.

Considering the industrial values, such as the transparency, low coloring factor and heat resistance of the resultant heat-resistant resin, the maleimide-based monomer is preferably N-phenyl maleimide or N-cyclohexyl maleimide, and more preferably N-cyclohexyl maleimide.

If N-tribromophenyl maleimide is used as the maleimide-based monomer, it is possible to impart fire retardancy to the resultant heat-resistant resin as well as transparency and heat resistance. It is possible to use only one kind, or a combination of more than one kind of the above-exemplified maleimide-based monomers.

As the polymerizable monomer which is copolymerizable with the above-mentioned maleimide-based monomer, it is desirable to use the one containing methacrylic ester like methyl methacrylate as a principal component because it can impart the transparency.

In this method, it is possible to improve the heat resistance of the heat-resistant resins by using a large amount of maleimide-based monomer. Moreover, even when such a large amount of maleimide-based monomer is used, if a maleimide-based monomer whose yellowness in solution is not higher than 1.0 is used, it is possible to reduce the coloration of the resultant heat-resistant resin, thereby achieving stable production of heat-resistant resins having excellent transparency and a low coloring factor, whose yellowness in solution is not higher than 4.

The present inventor studied heat-resistant resins using monomer components containing a maleimide-based monomer (a) as a polymerizable monomer and a process for producing the heat-resistant resins, and discovered that it is necessary to reduce the amount of a non-radical polymerizable compound (b) which is contained as a byproduct in the maleimide-based monomer (a) and has a low melting point. Thus, a compound (c) reactive with the non-radical polymerizable compound (b) was used, and a reaction of the non-radical polymerizable compound (b) and the compound (c) was performed so that the resultant heat-resistant resin contained a compound (d) having lower volatility than the non-radical polymerizable compound (b). As a result of the above-mentioned control, the inventor found a heat-resistant resin which exhibits excellent transparency and heat resistance and reduces the deterioration of appearance and transparency when molded to produce a molded article, and a simplified process for producing the heat-resistant resin. The present invention was completed based on this knowledge.

Namely, the above-mentioned heat-resistant resin is a heat-resistant resin which is produced by the polymerization of monomer components containing the non-radical polymerizable compound (b) and the maleimide-based monomer (a), and contains the compound (d) of lower volatility than the non-radical polymerizable compound (b), formed by the use of the compound (c) reactive with the non-radical polymerizable compound (b).

The process for producing the heat-resistant resin of the present invention is characterized by reducing the non-radical polymerizable compound (b) when polymerizing the monomer components containing the maleimide-based monomer (a) and the non-radical polymerizable compound (b) having a functional group with the use of the compound (c) having a reactive group reactive with the functional group.

As the reactive group, at least one group selected from the group consisting of isocyanate, epoxy, hydroxy, and amino groups is preferably used. The melting point of the compound (d) prepared by the reaction of the non-radical polymerizable compound (b) and the compound (c) is preferably not lower than 200° C. The non-radical polymerizable compound (b) may be a byproduct produced during the preparation of the maleimide-based monomer (a).

It is possible to polymerize the monomer components after adding the compound (c) to the monomer components so as to perform a reaction of the compound (c) and the non-radical polymerizable compound (b). It is also possible to add the compound (c) after the polymerization of the monomer components so as to perform a reaction of the compound (c) and the non-radical polymerizable compound (b).

The above-mentioned structure and process can impart excellent heat resistance to the resultant heat-resistant resin by the use of the maleimide-based monomer (a).

Moreover, in the above-mentioned structure and process, since the compound (c) reactive with the non-radical polymerizable compound (b) contained in the maleimide-based monomer (a) is used, it is possible to reduce the content of the non-radical polymerizable compound (b) with a low melting point, for example, lower than 200° C., and produce a heat-resistant resin containing the compound (d) having a high melting point of not lower than 200° C. and lower volatility than the non-radical polymerizable compound (b) Thus, in the above-mentioned structure and process, since the content of the non-radical polymerizable compound (b) in the resultant heat-resistant resin can be reduced, it is possible to reduce the deterioration of the appearance and transparency of a molded article produced from the heat-resistant resin, caused by the non-radical polymerizable compound (b), by a simplified step, for example, adding the compound (c) during the polymerization.

Another heat-resistant resin of the present invention is a heat-resistant resin produced by the polymerization of monomer components containing the non-radical polymerizable compound (b) and the maleimide-based monomer (a), and contains the compound (d) of lower volatility than the non-radical polymerizable compound (b) because of the compound (c) reactive with the non-radical polymerizable compound (b).

Another process for producing heat-resistant resins of the present invention is a process for producing heat-resistant resins by reducing the non-radical polymerizable compound (b) during the polymerization of monomer components containing the maleimide-based monomer (a) and the non-radical polymerizable compound (b) having a functional group with the use of the compound (c) having the group reactive with the functional group.

The non-radical polymerizable compound (b) is a compound having at least one functional group selected from the group consisting of carboxyl, acid anhydride, primary amino and secondary amino groups, with a non-polymerizable property, and a melting point in the range, for example, from 100° C. and 200° C.

The non-radical polymerizable compound (b) volatilizes in the solvent removing step for producing a heat-resistant resin and in the molding step of the heat-resistant resin, and adheres to the vent port and mold surfaces. Consequently, the production of the heat-resistant resin becomes unstable, and the smoothness of the surface of the molded article produced from the heat-resistant resin is impaired, causing problems such as worsening the appearance of the molded article.

The non-radical polymerizable compound (b) is an impurity which is by-produced or derived during the preparation of the maleimide-based monomer (a). For example, the non-radical polymerizable compound (b) is the above-mentioned N-cyclohexylamino succinic anhydride (hereinafter referred tot as CASA) when N-cyclohexylmaleimide is used as the maleimide-based monomer (a), or primary amines derived from the purification of the maleimide-based monomer (a) by distillation. The content of the non-radical polymerizable compound (b) is usually 0.001 to 2 weight percent based on the maleimide-based monomer (a) which is industrially used.

The compound (c) reactive with the non-radical polymerizable compound (b) is not limited to particular compounds, and it is possible to use any compounds that contain at least one reactive group selected from the group consisting of isocyanate, epoxy, hydroxy and amino groups, and can prevent the problems caused by the volatilization of the non-radical polymerizable compound (b) by reacting with the non-radical polymerizable compound (b) to polymerize the non-radical polymerizable compound (b) in heating or in the polymerization of the monomer components.

As a combination of the functional group of the non-radical polymerizable compound (b) and the reactive group of the compound (c), when the functional group is a carboxyl group or acid anhydride group, the preferred reactive group is an epoxy group, hydroxy group or amino group. On the other hand, when the functional group is an amino group, the preferred reactive group is an isocyanate group or epoxy group.

The compound (c) is a compound having at least one reactive group selected from the group consisting of I) isocyanate group, II) epoxy group, III) hydroxy group, and IV) amino group, for example, a compound represented by the general formula

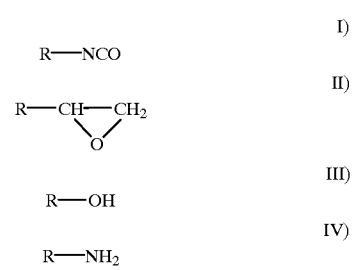

(where R is an alkyl, phenyl, substituted phenyl or benzyl group, or polyethylene glycol chain having 2 to 30 carbons).

As the compound (d) obtained by the reaction of the non-radical polymerizable compound (b) and the compound (c), it is desirable to use a compound whose melting point is not lower than 200° C., or whose volatile content at a preset temperature (normally in the range from 250 to 300° C.) in the solvent removing step or molding of the heat-resistant resin is not higher than 50 weight percent, preferably, not higher than 20 weight percent. The volatile content in heating is calculated from a measurement of the loss in weight by the thermogravimetric analysis.

The compound (c) is selected and added to initiate the reaction with the non-radical polymerizable compound (b) so as to achieve the above-mentioned melting point or the loss in weight in the above-mentioned range. As a result, the volatility of the compound (d) obtained by the reaction of the non-radical polymerizable compound (b) and the compound (c) becomes less than that of the non-radical polymerizable compound (b).

Thus, the addition of the compound (c) prevents a lowering of the surface smoothness of a molded article due to the non-radical polymerizable compound (b) which easily volatilizes and is hard to be removed from the maleimide-based monomer (a) in molding the heat-resistant resin. It is therefore possible to prevent the surface smoothness, optical properties including transparency, and appearance of the molded article from being impaired.

Moreover, in the solvent removing step during the production of the heat-resistant resin, it is possible to prevent the production of the heat-resistant resin from becoming instable due to the adhesion of the non-radical polymerizable compound (b) to the reducing line or the adhesion of the non-radical polymerizable compound (b) as gum to the outlet of the resin without performing purification, etc., for removing the non-radical polymerizable compound (b) from the maleimide-based monomer (a).

The non-radical polymerizable compound (b) and the compound (d) are obtained by performing separation using tetrahydrofuran (THF) as a eluting solution in a GPC column, and then condensation and drying. The melting point and the loss in weight of each of the non-radical polymerizable compound (b) and compound (d) are measured.

The timing to add the compound (c) is
1) before polymerization, i.e., the compound (c) is mixed with the maleimide-based monomer (a), solvent, and monomer components, and then a mixed solution of the non-radical polymerizable compound (b) and the compound (c) reacted by heating is polymerized, 2) during polymerization, i.e., the compound (c) is added when performing polymerization, and the reaction of the non-radical polymerizable compound (b) and the compound (c) is carried out while performing the polymerization by heating, or 3) after polymerization, i.e., the compound (c) is added after polymerization and heated to cause a reaction with the non-radical polymerizable compound (b).

The heating temperature is not particularly limited if it is a temperature at which the reaction of the non-radical polymerizable compound (b) and the compound (c) is carried out. However, considering the vapor pressure of a solvent used, the reaction efficiency of the non-radical polymerizable compound (b) and the compound (c), and the temperature for performing a polymerization, the preferred heating temperature is usually within the range between 60° C. and 150° C.

Examples of the monomer components are those formed by 10 to 60 weight percent, more preferably 15 to 50 weight percent of the maleimide-based monomer (a) containing the non-radical polymerizable compound (b), and 90 to 40 weight percent, more preferably 85 to 50 weight percent of one kind of other copolymerizable monomer or a mixture of more than one kind of other copolymerizable monomers.

When a compound containing methacrylic ester as a principal component is used as the other copolymerizable monomer, it is possible to stably produce a heat-resistant resin which exhibits high heat resistance while maintaining its excellent optical properties and moldability.

In this specification, the expression "weight percent" means that the monomer components are loaded so that the total thereof always becomes 100 weight percent. For instance, when 15 weight percent of the maleimide-based monomer (a) is loaded, the loading of methacrylic ester is readily set at 85 weight percent.

Still another process for producing heat-resistance resins of the present invention is a process for producing heat-resistant resins by the polymerization of monomer components having a radical polymerization property, and characterized by achieving the coexistence of part of an antioxidant during the polymerization of the monomer components and adding the remaining antioxidant after the polymerization of the monomer components.

In this process, since part of the antioxidant coexists during the polymerization, it is possible to prevent the generation of coloring components during the polymerization without interfering with the polymerization. Moreover, since the remaining antioxidant is added after the polymerization, it is possible to sufficiently reduce the coloration of the heat-resistant resins in heating performed after the polymerization, for example, in the solvent removing step or molding. Consequently, heat-resistant resins with a reduced coloring factor can be efficiently produced.

Another process for producing a heat-resistant resin of the present invention is characterized in that the antioxidant is at least one kind of antioxidant selected from the group consisting of phenol-based antioxidants and phosphorus-based antioxidants. This process can further reduce the coloration of the resultant heat-resistant resins.

Another process for producing heat-resistant resins of the present invention is characterized in that the antioxidant is a hindered phenol-based antioxidant. This process can further reduce the coloration of the resultant heat-resistant resins.

Another process for producing heat-resistant resins of the present invention is characterized in that the sum of antioxidants used is in the range from 0.0001 to 1 weight parts based on 100 weight parts of the monomer components, and the weight ratio of the antioxidant which coexists during polymerization to the antioxidant which is added after the polymerization is in the range from 1/99 to 99/1.

In this process, it is possible to certainly prevent interference in polymerization, and surely reduce the coloration of the resultant heat-resistant resins.

Another process for producing heat-resistant resins of the present invention is characterized in that the radical polymerizable monomer components further contain a maleimide-based monomer. This process can provide heat-resistant resins with excellent heat resistance.

Another process for producing heat-resistant resins of the present invention is characterized in that the radical polymerizable monomer components further contains a methacrylic ester. This process can provide heat-resistant resins with excellent transparency.

The process for producing heat-resistant resins of the present invention uses an antioxidant for reducing the coloration of heat-resistant resins, causes part of the antioxidant to coexist during the polymerization of the monomer components, and adds the remaining antioxidant to the monomer components after the completion of the polymerization.

As the antioxidant which coexists during the polymerization of the monomer components, it is possible to use at least one kind of antioxidant which is selected from the group consisting of phenol-based antioxidants and phosphorous-based antioxidants and can reduce the generation of coloring components during the polymerization. Among these antioxidants, it is preferred to use at least a phenol-based antioxidant.

Particularly preferred hindered phenol-based antioxidants are those in which the approach of other monomers to the hydroxy group is three-dimensionally prevented. Examples of such hindered-phenol-based antioxidants include 2,4-bis (N-octylthio)-6-(4-hydroxy-3,5-di-t-butyl anilino)-1,3,5-triazine, 2,2'-thiobis-(4-methyl-6-t-butyl phenol), triethylene glycol-bis-[3-(3-t-butyl-5-methyl-4-hydroxyphenyl) propionate], pentaerythrityl-tetrakis[3-(3,5-di-t-butyl-4-hydroxyphenyl)propionate], octadecyl-3-(3,5-di-t-butyl-4-hydroxyphenyl)propionate, 2,2-thiodiethylene-bis[3-(3,5-di-t-butyl-4-hydroxyphenyl)propionate], 1,6-hexanediol-bis [3-(3,5-di-t-butyl-4-hydroxyphenyl)propionate], tris-(3,5-di-t-butyl-4-hydroxybenzyl)-isocyanurate, 1,3,5-trimethyl-2,4,6-tris(3,5-di-t-butyl-4-hydroxybenzyl)benzene, N,N'-hexamethylenebis(3,5-di-t-butyl-4-hydroxy-hydrocinnamamide), and 3,5-di-t-butyl-4-hydroxy-benzyl phosphonate-diethyl ester. It is possible to use one kind or more than one kind of these compounds. Among these compounds, it is particularly preferred to use pentaerythrityl-tetrakis[3-(3,5-di-t-butyl-4-hydroxyphenyl) propionate].

The phenol-based antioxidant can be used solely. However, the coloration of the heat-resistant resin can further be reduced if the phenol-based antioxidant is used together with a phosphorous-based antioxidant. Examples of the phosphorous-based antioxidant include trisnonylphenyl phosphite, triphenyl phosphite, trilauryl trithiophosphite, trioctadecyl phosphite, diisodecyl pentaerythritol diphosphite, distearyl pentaerythritol diphosphite, 1,3,5-tris (3,5-di-t-butyl-4-hydroxybenzyl)-S-triazine-2,4,6-(1H,3H, 5H) trione, tris(2,4-di-t-butylphenyl)phosphite dinonylphenyl pentaerythritol diphosphite, di(2,4-di-t-butylphenyl) pentaelithritol diphosphite, tetraphenyl dipropylene glycol diphosphite, 4,4'-isobutylidenebis-(3-methyl-6-t- butylphenyl-ditridecyl phosphite), 4,4'-isopropylidene diphenyl tetradodecylphosphite, 1,1,3-tris[(2-methyl-4-ditridecyl phosphite-5- t-butyl) phenyl]butane, tetraphenyl tetradecyl pentaerythritol tetraphosphite, poly(dipropylene glycol) phenyl phosphite, bisphenol A pentaerythritol phosphite, hydro bisphenol A phosphite resin, 9,10-dihydro-9-oxa-10-phosphaphenanthrene-10-oxide, 10-decyloxy-9, 10-dihydro-9-oxa-10-phosphaphenanthrene, tetrakis(2,4-di-t-butylphenyl)-4,4'-biphenylene phosphonite, o-cyclohexyl phenyl phosphite, tris(2,4-di-t-butylphenyl) phosphite. It is possible to use one kind or more than one kinds of these compounds.

The amount of the antioxidant which coexists during the polymerization of the monomer components is preferably 0.0001 to 0.05 weight parts, and more preferably 0.001 to 0.02 weight parts, based on 100 weight parts of the monomer components. If more than 0.05 parts of the antioxidant coexists in the polymerization of the monomer components, the polymerization is interfered, and the conversion rate is lowered, causing an undesirable result. On the other hand, if the content of the antioxidant which coexists during the polymerization of the monomer components is less than 0.0001 weight parts, the generation of coloring components during the polymerization may not be sufficiently suppressed.

Although the addition of the antioxidant before the polymerization of the monomer components is preferred, the method of allowing the coexistence of the antioxidant during the polymerization of the monomer components is not particularly limited. For example, after initiating the polymerization of the monomer components, the antioxidant may be consecutively added during the polymerization.

On the other hand, as the antioxidant to be added after the completion of the polymerization of the monomer components, it is desirable to use an antioxidant capable of reducing the generation of coloring components in heating like in the solvent removing step and molding performed after the completion of the polymerization. It is possible to use at least one kind of an antioxidant selected from the group consisting of phenol-based antioxidants and phosphorous-based antioxidants. The use of at least a phenol-based antioxidant is more preferred.

As the phenol-based antioxidant, the above-mentioned hindered phenol-based antioxidants are particularly preferred. It is possible to use the phenol-based antioxidant alone, but the use of the phenol-based antioxidant together with the above-mentioned phosphorous-based antioxidant can further reduce the coloration of the heat-resistant resin. As the antioxidant to be added after the polymerization of the monomer components, a compound which is the same as or different from the antioxidant which coexists during the polymerization of the monomer components can be used.

The amount of antioxidant to be added after the polymerization of the monomer components is preferably in the range from 0.01 to 1.0 weight parts, and more preferably in the range from 0.02 to 0.5 weight parts, based on 100 weight parts of the monomer components. If the amount of the antioxidant added after the polymerization of the monomer components is less than 0.01 weight parts, the coloration of the heat-resistant resin in heating performed after the completion of the polymerization may not be sufficiently suppressed. Moreover, the addition of more than 1.0 weight part of the antioxidant after the completion of the polymerization of the monomer components is not an efficient method because a coloration reducing effect corresponding to the increase in the amount of the antioxidant cannot be produced.

Furthermore, it is preferred to arrange the sum of antioxidants (the sum of the antioxidant which coexists during the polymerization and the antioxidant added after the completion of the polymerization) to be in the range from 0.01 to 1 weight part based on 100 weight parts of the monomer components, and the weight ratio of the antioxidant which coexists during the polymerization to the antioxidant which is added after the polymerization to fall in the range from 1/99 to 99/1. This arrangement can improve the conversion rate by preventing the antioxidant from interfering with the polymerization, and sufficiently suppress both the generation of coloring components during the polymerization and the coloration of the heat-resistant resin in heating performed after the completion of the polymerization.

If the sum of the antioxidants is less than 0.01 weight parts, the coloration of the heat-resistant resin in heating performed after the completion of the polymerization may not be sufficiently suppressed. On the other hand, even if more than 1.0 weight part of antioxidant is added after the completion of the polymerization of the monomer components, a coloration reducing effect corresponding to the increase in the amount of antioxidant is not observed. Thus, this is not an efficient method.

As a method of adding the antioxidant after the completion of the polymerization of the monomer components, it is preferred to add the antioxidant before treating a polymeric liquid obtained after the completion of the polymerization of the monomer components, for example, before the solvent removing step in the case of solution polymerization.

As the radical polymerizable monomer components, it is desirable to use monomer components which are not colored during polymerization or in heating performed after the polymerization by the use of alcohol. However, monomer components containing the above-mentioned maleimide-based monomer is particularly preferred because it can provide heat-resistant resins with excellent heat resistance. In order to improve the transparency of the resultant heat-resistant resins, it is preferred to use monomer components containing the above-mentioned methacrylic ester.

It is possible to use only a maleimide-based monomer, or a mixture of a maleimide-based monomer and a polymerizable monomer which is copolymerizable with the maleimide-based polymerizable monomer (hereinafter referred to as the "monomer mixture") as the above-mentioned monomer components containing a maleimide-based monomer.

The above-mentioned compounds can be used as the above-mentioned maleimide-based monomer. Considering the industrial values, such as the transparency, low coloring factor and heat resistance, of the resultant heat-resistant resins, N-phenyl maleimide and N-cyclohexyl maleimide are preferred, and N-cyclohexyl maleimide is more preferred. In addition, if N-tribromophenyl maleimide is used, it is possible to impart flame retardancy to the resultant heat-resistant resins as well as the transparency and heat resistance. It is possible to use only one kind or a mixture of more than one kind of the above-exemplified maleimide-based monomers. As the copolymerizable polymerizable monomer (hereinafter referred to as the "copolymerizable monomer"), it is desirable to use a compound having an unsaturated bonding copolymerizable with the maleimide-based monomer. Examples of such a compound are the above-mentioned methacrylic ester, and other monomers which are copolymerizable with both the maleimide-based monomer the methacrylic ester. It is possible to use one kind or more than one kind of the above-mentioned other monomers.

As the copolymerizable monomer, it is preferred to use methacrylic ester, and it is more preferred to use the methacrylic ester together with an aromatic vinyl or acrylic ester in order to obtain highly transparent heat-resistant resins. Further, the polymerizable monomer preferably contains methacrylic ester as a principal component.

The ratio of the maleimide-based monomer to the monomer components (maleimide-based monomer or monomer mixture) is 10 to 60 weight percent, and more preferably 15 to 50 weight percent. If the ratio of the maleimide-based monomer is less than 10 weight percent, there is a possibility of lowering the heat resistance of the heat-resistant resins. On the other hand, if the ratio of the maleimide-based monomer is more than 60 weight percent, since the ratio of the copolymerizable monomer as other monomer components inevitably becomes less than 40 weight percent, there is a possibility of lowering of the physical properties, such as the transparency, of the resultant heat-resistant resin.

As a method of polymerizing the above-mentioned monomer components, it is possible to use polymerization methods using a solvent, such as solution polymerization, bulk polymerization, and suspension-bulk polymerization. Among these polymerization methods, solution polymerization is particularly suitable because it allows easy control of the composition and molecular weight of the heat-resistant resin.

Next, the following description will discuss in detail the monomer mixture used for the production of the heat-resistant resins.

As the above-mentioned polymer mixture, it is desirable to use a mixture containing 10 to 60 weight percent, more preferably 15 to 50 weight percent of maleimide-based monomer, and 90 to 40 weight percent, more preferably 85 to 50 weight percent of methacrylic ester, and, if necessary, 0 to 20 weight percent of other monomer copolymerizable with the maleimide-based monomer and the methacrylic ester. Such a loading allows stable production of highly transparent heat-resistant resins while maintaining excellent optical properties and moldability.

In this specification, the expression "weight percent" means that the monomer components are loaded so that the total thereof always becomes 100 weight percent. For instance, when 15 weight percent of the maleimide-based monomer is loaded, the loading of methacrylic ester is readily set at 85 weight percent.

The ratio of the methacrylic ester to the monomer mixture is preferably in the range from 40 to 90 weight percent. If the ratio of the maleimide-based monomer is less than 40 weight percent, there is a possibility that the excellent properties of methacrylic ester, such as the transparency, deteriorate in the resultant heat-resistant resins. On the other hand, if the ratio of the methacrylic ester is more than 90 weight percent, since the ratio of the maleimide-based monomer inevitably becomes less than 10 weight percent, there is a possibility that the resultant heat-resistant resins show lowered heat resistance.

The above-mentioned monomer mixture may contain other monomers, if necessary. It is desirable to use compounds copolymerizable with the maleimide-based monomer and the methacrylic ester as the other monomers. Examples of the other monomers include: aromatic vinyls; unsaturated nitrites; acrylic esters; olefins; dienes; vinyl ethers; vinyl esters; vinyl fluorides; allyl esters or methacrylic esters of saturated aliphatic monocarboxylic acids such as allyl propionate; poly(meth)acrylates; polyallylates; glycidyl compounds; and unsaturated carboxylic acids. Among these exemplified compounds, aromatic vinyls are particularly preferred.

Examples of the aromatic vinyls include styrene, α-methylstyrene, paramethylstyrene, isopropenyl styrene, vinyl toluene, and chlorostyrene. Among these aromatic vinyls, styrene is particularly preferred.

Examples of the unsaturated nitrites include acrylonitrile, methacrylonitrile, ethacrylonitrile, and phenyl acrylonitrile. As the above-mentioned acrylic esters, an acrylic ester having at least one group selected from the group consisting of alkyl, cyclohexyl and benzyl groups having 1 to 18 carbons.

Examples of the acrylic esters include methyl acrylate, ethyl acrylate, propyl acrylate, isopropyl acrylate, butyl acrylate, isobutyl acrylate, t-butyl acrylate, amyl acrylate, isoamyl acrylate, octyl acrylate, 2-ethylhexyl acrylate, decyl acrylate, lauryl acrylate, cyclohexyl acrylate, benzyl acrylate, and 2-hydroxylethyl acrylate.

Examples of the above-mentioned olefins include ethylene, propylene, isobutylene, and diisobutylene. Examples of the dienes are buthadiene, and isoprene. Examples of the vinyl ethers are methyl vinyl ether, and butyl vinyl ether. Examples of the vinyl esters are vinyl acetate, and vinyl propionate. One example of the vinyl fluoride is vinylidene fluoride.

Examples of the above-mentioned poly(meth)acrylates include ethylene glycol di(meth)acrylate, diethylene glycol (meth)acrylate, divinyl benzene, diallyl phthalate, trimethylolpropane tri(meth)acrylate, hexanediol di (meth) acrylate, pentaerythritol tetra(meth)acrylate, dipentaerythritol hexa (meth)acrylate, di(meth)acrylate of bisphenol A-ethylene oxide or propylene oxide addition product, di(meth)acrylate of halogenated bisphenol A-ethylene oxide or propylene oxide addition product, and di or tri(meth)acrylate of isocyanurate-ethylene oxide or propylene oxide addition product.

One example of the above-mentioned polyallylates is triallyl isocyanurate. Examples of the above-mentioned glycidyl compounds are glycidyl (meth)acrylate, and allyl glycidyl ether. Examples of the above-mentioned unsaturated carboxylic acids include acrylic acid, methacrylic acid, itaconic acid, maleic acid, fumaric acid, and their semi-esterified compounds or anhydrides. It is possible to use only one kind or a mixture of more than one kind of the exemplified compounds as the other monomers.

The ratio of the other monomers to the monomer mixture is preferably in the range from 0 to 20 weight percent. The ratio of the aromatic vinyls to the monomer mixture is preferably less than 15 weight percent. If the ratio of the other monomers to the monomer mixture is more than 20 weight percent, or if the ratio of the aromatic vinyls to the monomer mixture is not less than 15 weight percent, there is a possibility of lowering the transparency, heat resistance and weather resistance of the resultant heat-resistant resins.

Another process for producing heat-resistant resins of the present invention is characterized in polymerizing the above-mentioned monomer mixture using a solvent containing alcohol, and then distilling off and separating volatile components containing alcohol under heating and reduced pressure.

In this process, with the use of a large amount of alcohol, it is possible to sufficiently prevent the coloration of heat-resistant resins during polymerization or heating performed after the polymerization, and provide heat-resistant resins of a lower coloring factor. Moreover, even when a large amount of alcohol is used, since the volatile components containing alcohol are distilled off and separated under heating and reduced pressure so as to prevent the alcohol from remaining in the resin, it is possible to prevent the resultant molded article from having disadvantages caused by the alcohol, namely lower heat resistance and impaired appearance. In addition, since the volatile components containing alcohol are separated, if the alcohol is recovered and reused, the production efficiency can be improved.

A process for producing heat-resistant resins of the present invention is characterized in polymerizing the above-mentioned monomer mixture using a solvent, adding alcohol, and then distilling off and separating volatile components containing alcohol under heating and reduced pressure.

In this process, with the use of a large amount of alcohol, it is possible to sufficiently prevent the coloration of heat-resistant resins during heating performed after the polymerization, for example, in the solvent removing step or molding, thereby providing heat-resistant resins of a lower coloring factor. Moreover, even when a large amount of alcohol is used, since alcohol is added after the polymerization but before the solvent removing step and the volatile components containing alcohol are distilled off and separated under heating and reduced pressure so as to prevent the alcohol from remaining in the resin, it is possible to obtain heat-resultant resins of excellent physical properties including mechanical strength without problems, such as the inhibition of polymerization and a lowering of the molecular weight caused by the alcohol.

As the above-mentioned alcohol, alcohols represented by general formula (2)

R—OH    (2)

(wherein R is a chained or branched alkyl, alkenyl, cycloalkyl, phenyl, substituted-phenyl, benzyl, 2-phenyl ethyl, or cinnamyl group having 5 to 30 carbons).

Examples of such an alcohol include aliphatic alcohols, such as n-pentanol, n-hexanol, n-octanol, and n-dodecanol; cycloalkanols, such as cyclopentanol, and cyclohexanol; benzyl alcohol; 2-phenyl ethanol; and cinnamic alcohol. It is possible to use only one kind or a mixture of more than one kind of the above alcohols.

The boiling point of alcohol suitable for distilling off the alcohol as volatile components in the solvent removing step performed after the solution polymerization depends on the temperature and the degree of reduced pressure in the solvent removing step. In general, when the content of the maleimide-based monomer unit in the resultant heat-resistant resin is in the range from 10 weight percent to 60 weight percent, the boiling point of alcohol is preferably in the range from 80 to 300° C., and more preferably in the range from 120 to 260° C. When the boiling point of alcohol is in such a range, the alcohol can be easily distilled off as volatile components after the completion of polymerization.

The amount of alcohol is preferably in the range from 0.1 weight parts to 20 weight parts, and more preferably from 1 weight part to 5 weight parts, based on 100 weight parts of the monomer mixture. If the amount of alcohol is below this range, a sufficient coloration reducing effect is not produced. On the other hand, if the amount of alcohol is over this range, the alcohol affects the polymerization and the solubility of the resultant polymer, for example, the polymer is separated out and sufficient agitation cannot be performed. Thus, the addition of alcohol in an amount exceeding this range is also not preferred.

As the method of adding alcohol, it is possible to add alcohol before or during polymerization, and use the alcohol at least as part of a solvent, or it is possible to add alcohol before the solvent removing step after the polymerization.

Between these methods, the addition of alcohol before performing the solvent removing step after the polymerization is more preferred because this method produces a sufficient coloration reducing effect and prevents vicious effects such as a lowering of the molecular weight due to the inhibition of polymerization and chain transfer in the polymerization.

When adding an alcohol before or during polymerization, it is possible to perform polymerization by using only the alcohol as a solvent. However, it is preferred to mix an alcohol with other solvent.

As the solvent to be mixed with an alcohol, it is desirable to use common organic solvents, such as toluene, xylene, ethyl benzene, isopropyl benzene, methyl isobutyl ketone, butyl Cellosolve (ethylene glycol butyl ether), N,N'-dimethyl formamide, 2-methyl pyrrolidone, and methyl ethyl ketone. Among these solvents, preferred organic solvents are those which can be distilled off as volatile components in the solvent removing step performed after the polymerization and ease the removal of the alcohol by distillation. For example, toluene is suitably used. When adding the alcohol before the solvent removing step performed after the polymerization, the above-mentioned solvents can be used as a solvent in the polymerization. The amount of the solvent is not particularly limited.

The volatile components containing the alcohol added are distilled off and separated by heating the mixture under reduced pressure in the solvent removing step performed after the polymerization. The conditions for the solvent removing step, such as the temperature and the degree of reduced pressure, are selected by considering the boiling point of the alcohol, etc. so as to sufficiently reduce the amount of the remaining alcohol. More specifically, for example, it is preferred to use an extruder to distill off and separate the volatile components by heating the mixture to a temperature higher than 180° C. at which the heat-resistant resin melts under reduced pressure. If the temperature in the solvent removing step is lower than 180° C., the amount of the remaining alcohol may not be sufficiently reduced.

By distilling off the volatile components containing the alcohol in such a manner, the amount of the alcohol remaining in the heat-resistant resin can be sufficiently reduced. Consequently, even if a large amount of alcohol is used, it is possible to prevent a lowering of the heat resistance of the heat-resistant resin, and defective appearance like a silver streak when the heat-resistant resin is molded.

It is thus possible to sufficiently prevent the coloration of the heat-resistant resin in heating during polymerization and the solvent removing step after the polymerization, with the use of a large amount of alcohol. Moreover, it is possible to improve the production efficiency by recovering and reusing the alcohol which is distilled off.

A still another process for producing heat-resistant resins of the present invention is characterized in polymerizing the above-mentioned monomer mixture in the presence of a non-radical polymerizable acid anhydride and/or a non-radical polymerizable carboxylic acid.

In this process, it is possible to sufficiently prevent the coloration of the heat-resistant resins in heating performed during or after the polymerization while preventing a lowering of the transparency and heat-resistance. It is thus possible to stably produce heat-resistant resins having excellent transparency and heat resistance, and a low coloring factor.

A still another process for producing heat-resistant resins of the present invention is characterized in adding a non-radical polymerizable acid anhydride and/or a non-radical polymerizable carboxylic acid after polymerizing the above-mentioned monomer mixture.

In this process, it is possible to sufficiently prevent the coloration of the heat-resistant resins during heating performed after the polymerization, for example, heating performed in the solvent removing step or molding, while preventing a lowering of the transparency and heat-resistance. It is thus possible to stably produce heat-resistant resins having excellent transparency and heat resistance, and a low coloring factor.

Moreover, in this process for producing heat-resistant resins, it is preferred to use a monomer mixture containing methacrylic ester in order to achieve a further improvement of the transparency of the resultant heat-resistant resins.

The above-mentioned invention will be explained in detail below.

A process for producing heat-resistant resins of the present invention includes polymerizing the above-mentioned monomer mixture in the presence of a non-radical polymerizable acid anhydride and/or non-radical polymerizable carboxylic acid. Alternatively, a process of producing a heat-resistant resin of the present invention includes adding a non-radical polymerizable acid anhydride and/or non-radical polymerizable carboxylic acid after polymerizing the above-mentioned monomer mixture.

As the copolymerizable monomer, it is preferred to use methacrylic ester in order to obtain a highly transparent heat-resistant resin. It is more preferred to use aromatic vinyls and acrylic esters together. The principal component of the copolymerizable monomer is desirably methacrylic ester.

As a method of polymerizing the monomer mixture, solution polymerization, bulk polymerization, suspension polymerization, emulsion polymerization, etc. can be used. The solution polymerization is particularly suitable because it can easily control the composition and molecular weight of the heat-resistant resin. On the other hand, in a method in which the removal of solvent is carried out by performing solution polymerization or bulk polymerization, it is possible to further enhance the effect of reducing the coloration of the heat-resistant resin. When performing polymerization using a solvent, it is desirable to use the above-mentioned common organic solvents. The amount of solvent is not particularly limited.

In the production process of the present invention, at least one compound selected from the group consisting of non-radical polymerizable acid anhydrides and non-radical polymerizable carboxylic acids (hereinafter referred to as the "non-radical polymerizable acid component") is added in order to reduce the coloration of the heat-resistant resins. The term "non-radical polymerizable" used in this specification means unpossessing of a carbon-carbon unsaturated bond, or possessing of a carbon-carbon unsaturated bond which is not radical-polymerized with a maleimide-based monomer or copolymerizable monomer.

More specifically, the non-radical polymerizable acid components are non-radical polymerizable carboxylic acids represented by general formula (3)

R—COOH (3)

(wherein R is a hydrogen atom, straight-chain or blanched alkyl group, alkenyl group, phenyl group, substituted phenyl group or benzyl group having 1 to 30 carbons, or polyethylene glycol chain), and non-radical polymerizable acid anhydrides represented by general formula (4)

(R—CO)$_2$O (4)

(wherein R is a hydrogen atom, straight-chain or blanched alkyl group, alkenyl group, phenyl group, substituted phenyl group or benzyl group having 1 to 30 carbons, or polyethylene glycol chain).

Examples of the non-radical polymerizable carboxylic acids include acetic acid, propionic acid, butyric acid, valeric acid, caproic acid, caprylic acid, capric acid, lauric acid, stearic acid, oleic acid, linolic acid, linolenic acid, benzoic acid, cyclohexane carboxylic acid, phthalic acid, isophthalic acid, and terephthalic acid. It is possible to use one kind or more than one kind of these non-radical polymerizable carboxylic acids.

Examples of the non-radical polymerizable acid anhydrides include the anhydrides of the above-mentioned non-radical polymerizable carboxylic acids, such as acetic anhydride, propionic anhydride, and phthalic anhydride. It is possible to use one kind or more than one kinds of these anhydrides. The non-radical polymerizable acid anhydrides are particularly suitable for use as the non-radical polymerizable acid components because they have a significant effect of reducing the coloration of the heat-resistant resins.

The boiling point of the non-radical polymerizable acid component is not particularly limited. However, when performing polymerization using a solvent, it is desirable to have a low boiling point so that the non-radical polymerizable acid component is distilled off in the solvent removing step performed after the polymerization.

The mechanism of the coloration reducing effect of these non-radical polymerizable acid components has not been clearly known. However, it is predicted that the non-radical polymerizable acid components react with amine components which are present as impurities in the maleimide-based monomer, convert the amine components into amido, and reduce the coloration of the heat-resistant resins due to oxidation. Moreover, when a phenol-based polymerization inhibitor is contained in the monomer mixture, it is predicted that the non-radical polymerizable acid components cause acetylation of the phenol-based polymerization inhibitor, and reduce the coloration of the heat-resistant resins due to oxidation.

The amount of the non-radical polymerizable acid components is preferably in the range from 0.01 weight parts to 10 weight parts, more preferably from 0.05 weight parts to 1 weight part, based on 100 weight parts of the monomer mixture. If the amount of the non-radical polymerizable acid components is below this range, it is impossible to produce a sufficient coloration reducing effect. On the other hand, if the amount of the non-radical polymerizable acid components exceeds this range, the heat resistance of the resultant heat-resistant resins may be lowered. Moreover, when polymerization is performed in the presence of a non-radical polymerizable acid component, the polymerization may be affected.

As the method of adding the non-radical polymerizable acid component, the non-radical polymerizable acid component may be added before or during polymerization. When adding the non-radical polymerizable acid component before polymerization, or before heating after the polymerization, for example, before the solvent removing step if polymerization is performed using a solvent. Among these methods, the addition of the non-radical polymerizable acid component before polymerization is particularly preferred.

If the non-radical polymerizable acid component has a relatively low boiling point, it is possible to distill off the non-radical polymerizable acid component. Namely, for example, by heating the non-radical polymerizable acid component under reduced pressure in the solvent removing step after performing solution polymerization or bulk polymerization using a solvent, it is possible to distill off the non-radical polymerizable acid component. The conditions such as the temperature and the degree of reduced pressure in the solvent removing step are not particularly limited, and can be selected by taking the boiling point of the non-radical polymerizable acid component, etc. into consideration so as to achieve a sufficient reduction in the amount of remaining non-radical polymerizable acid component.

When the non-radical polymerizable acid component is distilled off in the manner mentioned above, the amount of non-radical polymerizable acid component remaining in the heat-resistant resin can be reduced. As a result, the coloration of the heat-resistant resins during polymerization and heating performed after the polymerization, for example, in the solvent removing step, can be prevented. Moreover, there is no possibility that the non-radical polymerizable acid component causes a lowering of the heat resistance of the heat-resistant resin, and the appearance of the heat-resistant resin is impaired. Additionally, it is possible to improve the production efficiency and production cost by recovering and reusing the non-radical polymerizable acid component.

Moreover, when initiating the polymerization of the monomer mixture, a polymerization initiator is added. Examples of the polymerization initiator include organic peroxides, such as benzoyl peroxide, lauroyl peroxide, methyl ethyl ketone peroxide, t-butyl peroxy octoate, t-butyl peroxy benzoate, t-butyl peroxy-2-ethyl hexanoate, t-amyl peroxy-2-ethyl hexanoate, cumene hydroperoxide, cyclohexanone peroxide, dicumyl peroxide, bis(4-t-butyl cyclohexyl) peroxy dicarbonate, and t-butyl peroxy isopropyl carbonate; and azo compounds, such as 2,2'-azobisisobutyronitrile, and 2-phenyl azo-2,4-dimethyl-4-methoxy valero nitrile.

It is possible to use only one kind, or a mixture of more than one kind of these polymerization initiators. The amount of the polymerization initiator added to the monomer mixture is not particularly limited.

For the control of the molecular weight of copolymer, it is possible to use a chain transfer agent, for example, alkyl mercaptans such as butyl mercaptan and octyl mercaptan, and α-styrene dimer.

In the production process of the present invention, it is possible to add various types of additives, for example, known additives like ultraviolet light absorbers and stabilizers, during or after the polymerization.

The heat-resistant resins produced by the production process of the present invention can be used as they are, or blended with other synthetic resins, for example, polymethylmethacrylate resin, styrene-methyl methacrylate resin, ABS resin, AES resin, MBS resin, polystyrene, and PPE resin, using an extruder, etc.

Since the heat-resistant resins of the present invention have excellent heat resistance and transparency, and a low coloring factor, they are suitable for use as material of parts which require not only heat resistance and transparency but also beautiful appearance, such as a base of optical material like optical disks, automobile parts, covers for lights, and electrical equipment parts.

THE BEST MODE FOR CARRYING OUT THE INVENTION

Figure 1:
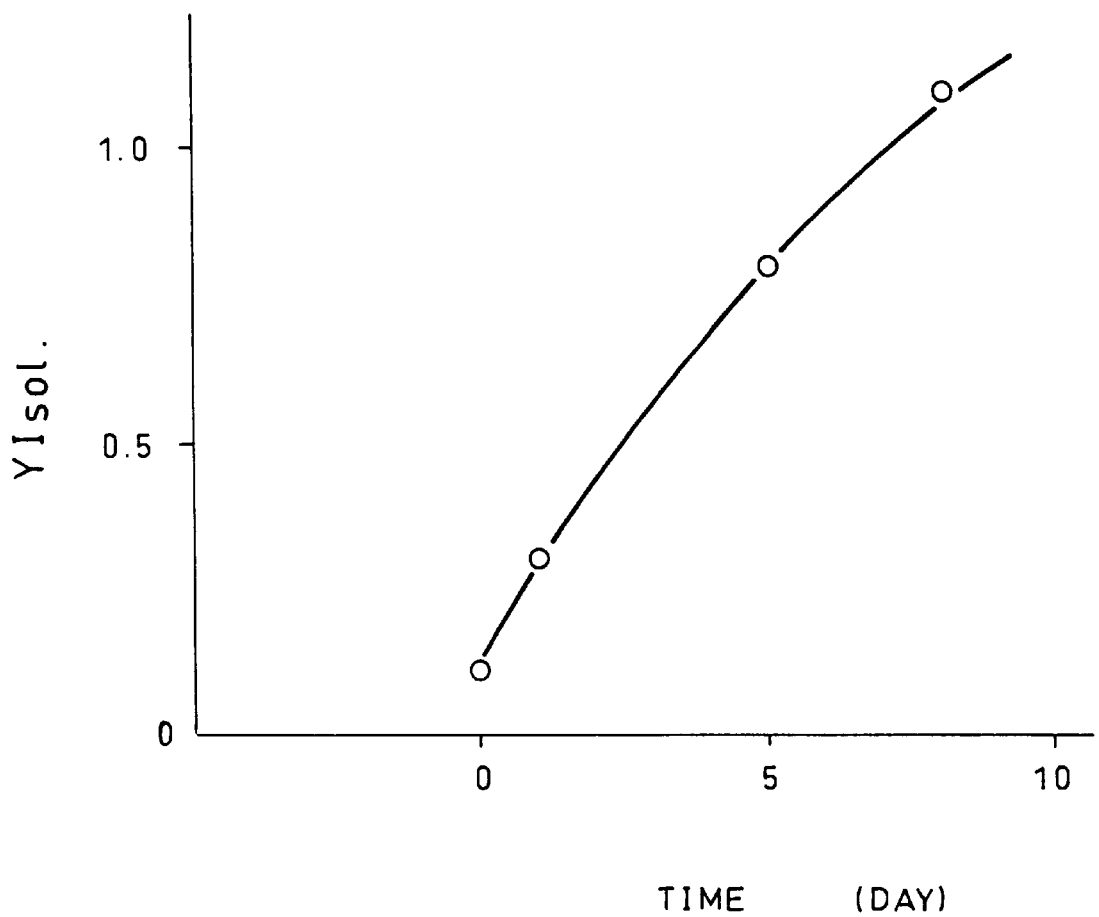
FIG. 1 is a graph showing a change with time in the coloration of N-cyclohexyl maleimide used in a process for producing heat-resistant resins of the present invention, measured by an accelerated heating test.

The following description will explain the present invention in detail by presenting some examples. The terms "part" and "percent" in the following description means "part by weight" and "percent by weight", respectively.

A raw material used for producing a heat-resistant resin of the present invention contains N-cyclohexyl maleimide unit, as a principal component, containing 0.001 to 1 percent of cyclohexylamino succinic anhydride (based on the N-cyclohexyl maleimide).

The identification and determination of the structure of the cyclohexylamino succinic anhydride were performed as follows.

Identification

A compound in the N-cyclohexyl maleimide was fractionated using high-speed liquid chromatography (LC-10A of Shimadzu Corporation). The fractionated liquid was dried under vacuum at 30° C. The resultant solids content was recrystallized with a mixed solvent containing chloroform and hexane in a ratio of 1 to 1, and then dried. Subsequently, the solids content was measured with an infrared spectrophotometer (Japan Biorat SPC-3200), a super-conductive Fourier transform nuclear magnetic resonance spectrometer (Varian VXR-300S), a gas chromatograph mass spectrometer (JMC-AX505WA of JEOL Ltd.), and a melting point measuring apparatus (Buch 501 K). The spectral values and analytic values are as follows.

IR(KBR):ν(cm$^{-1}$)=3400s, 2930s, 1695 vs, 1390s, 1195s, 1120s, 735m, 590m; $^1$H-NMR(300 MHz, DMSO-d$_6$):δ (ppm)=6.05 (1H, J=6.0 Hz, d), 4.40(1H, m), 3.80(1H, m), 2.95(1H, J=18, J=7.2, dd), 2.40(1H, J=18, J=5, dd), 2.00(2H, J=12.7, g), 1.80(2H, J=15, d), 1.6(3H, m), 1.20(3H, m); $^{13}$C-NMR(300 MHz, DMSO-d$^6$): δ(ppm)=178.13 (1C), 174.8 (1C), 65.8(1C), 50.4(lC), 37.6(1C), 28.6(1C), 28.3 (1C), 25.4(2C), 24.9(1C); GC-MS=197$^+$; Melting point= 155.5 to 156.5° C.

Quantification

After preparing a working curve of cyclohexylamino succinic anhydride using the high-speed liquid chromatography (LC-10A of Shimadzu Corporation), the content of the cyclohexylamino succinic anhydride in the N-cyclohexylmaleimide was measured under the following conditions.

Column: Shimadzu Zorbax-ODS (4.6 mmΦ×25 cm)
Mobile Phase: Mixed Solution of aqueous solution containing 0.005 mol potassium dihydrogen phosphate/liter and methanol in a ratio of 1:0.818 by weight
Column Temperature: 45° C.
Flow Rate: 0.8 ml/min.
Detector: UV220nm (6.55A, Hitachi, Ltd).
Preparation of Sample: 0.4 g of sample was precisely measured in the order of milligrams, dissolved in the mobile phase in a 50 ml measuring flask to 50 ml, and then 20 μl of the sample solution was injected into the column for analysis.

REFERENCE EXAMPLE 1

Maleic anhydride and an amount of ortho-xylene which was five times by weight per unit weight of the maleic anhydride were placed in a flask provided with a thermometer, a cooling pipe having a water separator, a dropping funnel and an agitator, and dissolved at 56° C. so as to prepare an ortho-xylene solution in which maleic anhydride was evenly dissolved. Thereafter, a solution containing cyclohexylamine in an amount which is the same as the maleic anhydride by a molar ratio and ortho-xylene in an amount which is the same as the cyclohexylamine by weight was all dropped into the maleic anhydride solution in 0.5 hours while agitating the solution at 56° C. As a result, a slurry of ortho-xylene of N-cyclohexyl maleic amido acid was synthesized.

Next, ortho-phosphoric acid as an acid catalyst in an amount as same as the cyclohexyl amine by weight, and 200 ppm of copper dibutyldithiocarbamate as a polymerization inhibitor to the N-cyclohexyl maleic amido acid were added to the slurry. The mixture was heated and maintained at 140° C. while agitating the mixtures and reacted for 7 hours while distilling off water which was produced by the reaction and ortho-xylene from the reaction system. After the completion of the reaction, a layer of the acid catalyst separated as a lower layer from the reaction solution at 140° C. was removed.

Subsequently, the reaction solution was heated to 60° C., and an amount of water which was the same as the organic layer by weight was added and washed for 30 minutes while agitating the mixture. Then, the organic layer was separated from the water layer. Thereafter, ortho-xylene was removed from the organic layer under reduced pressure of 10 mmHg. Further, by performing simple distillation under reduced pressure of 5 mmHg at a bulk temperature in the range from 130 to 150° C., a raw material containing white N-cyclohexylmaleimide as a principal component was obtained.

The content of cyclohexylamino succinic anhydride in the raw material thus obtained was measured to 2.5 percent. In the following Examples of the present invention and Comparative Examples, the content of cyclohexylamino succinic anhydride in the raw material containing N-cyclohexyl maleimide as a principal component was adjusted by changing the degree of purification performed by distillation and recrystallization.

EXAMPLE 1

A monomer mixture was prepared by mixing 20 parts of a raw material formed by N-cyclohexylmaleimide containing 0.9 percent of cyclohexylamino succinic anhydride and 80 parts of methyl methacrylate, and deaerated under reduced pressure of 200 mmHg for 10 minutes. 0.4 parts of lauryl peroxide as a polymerization initiator was dissolved in the monomer mixture, and molding is performed by cast polymerization as follows.

Cast Polymerization

A solution was prepared by blowing a nitrogen gas into the monomer mixture and sufficiently saturating the monomer mixture. The solution was gently poured into a frame formed by fixing glass plates (240×180×5 mm) with a soft vinyl tube (7×4 mm) so that the space between the glass plates was 4 mm, and heated in a water bath at 55° C. for 20 hours. Then, a transparent polymer plate (1) with a thickness of 3.0 mm was obtained.

The yellowness (YI) of the polymer plate (1) obtained by the above-mentioned cast polymerization was measured with a color difference meter (Σ80 of Nippon Denshoku Kogyo) according to JIS-K-7103. It was found that the yellowness (YI) of the polymer plate (1) was 0.8. Moreover, the glass transition temperature of the polymer plate (1) was measured with a thermal analyzer (DSC-8230/TAS-100 of Rigaku Denki K. K.) according to JIS K-7121. It was found that the glass transition temperature of the polymer plate (1) was 137° C.

EXAMPLE 2

A monomer mixture was prepared by mixing 20 parts of a raw material formed by N-cyclohexylmaleimide containing 0.01 percent of cyclohexylamino succinic anhydride and 80 parts of methyl methacrylate, and deaerated under reduced pressure of 200 mmHg for 10 minutes. 0.4 parts of lauryl peroxide as a polymerization initiator was dissolved in the monomer mixture. A transparent polymer plate (2) with a thickness of 3.0 mm was obtained by performing cast polymerization under the same conditions as in Example 1. The yellowness (YI) and glass transition temperature of the polymer plate (2) were 0.8 and 137° C., respectively.

It was found from the results of Examples 1 and 2 that a N-cyclohexyl maleimide-methyl methacrylate copolymer produced from a raw material formed by N-cyclohexyl maleimide containing cyclohexylamino succinic anhydride in an amount of not higher than 1 percent is transparent, has a low coloring factor as given by yellowness (YI) of not higher than 1, and excellent heat resistance as indicated by a glass transition temperature of not lower than 120° C.

COMPARATIVE EXAMPLE 1

A monomer mixture was prepared by mixing 20 parts of a comparative raw material formed by N-cyclohexylmaleimide containing 1.8 percent of cyclohexylamino succinic anhydride and 80 parts of methyl methacrylate, and deaerated under reduced pressure of 200 mmHg for 10 minutes. 0.4 parts of lauryl peroxide as a polymerization initiator was dissolved in the monomer mixture. A transparent comparative polymer plate (1) with a thickness of 3.0 mm was obtained by performing cast polymerization under the same conditions as in Example 1. The yellowness (YI) and glass transition temperature of the comparative polymer plate (1) were measured in the same manner as in Example 1. The yellowness (YI) and glass transition temperature were 2.4 and 138° C., respectively.

COMPARATIVE EXAMPLE 2

A monomer mixture was prepared by mixing 20 parts of a comparative raw material formed by N-cyclohexylmaleimide containing 2.5 percent of cyclohexylamino succinic anhydride and 80 parts of methyl methacrylate, and deaerated under reduced pressure of 200 mmHg for 10 minutes. 0.4 parts of lauryl peroxide as a polymerization initiator was dissolved in the monomer mixture. A transparent comparative polymer plate (2) with a thickness of 3.0 mm was obtained by performing cast polymerization under the same conditions as in Example 1. The yellowness (YI) and glass transition temperature of the comparative polymer plate (2) were measured in the same manner as in Example 1. The yellowness (YI) and glass transition temperature were 4.0 and 137° C., respectively.

It was found from the results of Comparative Examples 1 and 2 that an N-cyclohexyl maleimide-methyl methacrylate copolymer produced from the raw material formed by N-cyclohexyl maleimide containing cyclohexylamino succinic anhydride in an amount higher than 1 percent is transparent and has excellent heat resistance, but is highly colored (yellowed).

COMPARATIVE EXAMPLE 3

0.4 parts of lauryl peroxide as a polymerization initiator was dissolved in 100 parts of methyl methacrylate which was deaerated under reduced pressure of 200 mmHg for 10 minutes. A transparent comparative polymer plate (3) with a thickness of 3.0 mm was obtained by performing cast polymerization under the same conditions as in Example 1. The yellowness (YI) and glass transition temperature of the comparative polymer plate (3) were measured in the same manner as in Example 1. The yellowness (YI) and glass transition temperature were 0.8 and 114° C., respectively.

It was found from the results of Comparative Example 3 that the comparative polymer plate (3) as a methyl methacrylate polymer obtained by solely polymerizing methyl methacrylate without using N-cyclohexyl maleimide is transparent and has a low coloring factor. However, the comparative polymer plate (3) had lower heat resistance because its glass transition temperature was 114 ° C.

EXAMPLE 3

15.75 parts of methyl methacrylate, 6.25 parts of a raw material formed by N-cyclohexyl maleimide containing 0.01 percent of cyclohexylamino succinic anhydride, 25 parts of toluene, and 0.0025 parts of pentaerythrityl-tetrakis [3-(3, 5-di-tert-butyl-4-hydroxyphenyl) propionate] as a stabilizer were placed in a 20-liter stainless polymerizing tank having an agitator, and three dropping vessels, namely first, second and third dropping vessels.

On the other hand, a first mixed solution containing 15.75 parts of methyl methacrylate, 6 parts of styrene and 10 parts of toluene was placed in the first dropping vessel, and the dissolved oxygen was removed from the first mixed solution by performing bubbling with nitrogen gas in advance. Moreover, a second mixed solution containing 6.25 parts of the raw material formed by N-cyclohexyl maleimide containing 0.01 percent of cyclohexylamino succinic anhydride, and 10 parts of toluene was placed in the second dropping vessel, and the dissolved oxygen was removed from the second mixed solution by performing bubbling with nitrogen gas in advance. Furthermore, a third mixed solution containing 0.108 parts of tert-butyl peroxy isopropyl carbonate and 5 parts of toluene was placed in the third dropping vessel, and the dissolved oxygen was removed from the third mixed solution by performing bubbling with nitrogen gas in advance.

Bubbling of the solution in the polymerizing tank was performed for 10 minutes using nitrogen gas while agitating the solution at 300 rpm so as to remove the dissolved oxygen from the solution by nitrogen gas substitution. Thereafter, heating of the solution was initiated under the atmosphere of nitrogen gas. When the solution reached 110° C., 0.02 parts of tert-butyl peroxy isopropyl carbonate as a polymerization initiator was added to the solution.

Subsequently, the first, second and third mixed solutions were dropped into the solution in the polymerizing tank from the first, second and third dropping vessels, respectively, over 3.5 hours, and a polymerization was performed under refluxing at a polymerization temperature of 110° C. for 7 hours. Thereafter, 0.0475 parts of the above-mentioned stabilizer was further added to the solution in the polymerizing tank.

The polymeric liquid containing the copolymer in the polymerizing tank was supplied to a 30-mm twin screw extruder with a vent port and cylinder temperature being controlled at 240° C., and the solvent in the polymeric liquid was removed under vacuum through the vent port. The strand from the vent port was made into a pellet to produce a copolymer pellet (3) as a heat-resistant resin of the present invention. The yellowness (YIsol.) of the copolymer pellet (3) in a solution was 0.8.

Subsequently, the copolymer pellet (3) was molded using an injection molding machine which was controlled so as to have a cylinder temperature in the range from 250 to 260° C., a mold temperature of 100° C., and an injection pressure of 950 kg/cm². As a result, a transparent molded article with a thickness of 3 mm was obtained.

The yellowness (YI) and glass transition temperature of the molded article were measured in the same manner as in Example 1. The yellowness (YI) and glass transition temperature were 1.6 and 136° C., respectively.

It was found from the results of Example 3 that the N-cyclohexyl maleimide-methyl methacrylate copolymer produced from the raw material formed by N-cyclohexyl maleimide containing cyclohexylamino succinic anhydride in an amount of not higher than 1 percent has a low coloring factor and excellent heat resistance because the yellowness (YI) of the molded article was 1.6 and the glass transition temperature was not lower than 120° C.

COMPARATIVE EXAMPLE 4

A comparative copolymer pellet (4) was obtained in the same manner as in Example 3 except that a comparative raw material formed by N-cyclohexyl maleimide containing 1.8 percent of cyclohexylamino succinic anhydride was used instead of the raw material formed by N-cyclohexyl maleimide containing 0.01 percent of cyclohexylamino succinic anhydride used in Example 3. The yellowness (YIsol.) of the comparative copolymer pellet (4) in a solution was 4.1.

Subsequently, the comparative copolymer pellet (4) was molded in the same manner as in Example 3 so as to produce a transparent molded article with a thickness of 3 mm. The yellowness (YI) and glass transition temperature of the molded article were measured in the same manner as in Example 1. The yellowness (YI) and glass transition temperature were 6.4 and 136° C., respectively.

It was found from the results of Comparative Example 4 that the N-cyclohexyl maleimide-methyl methacrylate copolymer produced from the comparative raw material formed by N-cyclohexyl maleimide containing cyclohexylamino succinic anhydride in an amount higher than 1 percent is transparent and has excellent heat resistance, but is highly colored (yellowed).

It is clear from Examples 1 to 3 and Comparative Examples 1 to 4 that since the raw materials used for producing heat-resistant resins of the present invention contains N-cyclohexyl maleimide as a principal component, and 0.001 to 1 weight percent of cyclohexylamino succinic anhydride (based on the N-cyclohexyl maleimide), the heat-resistant resins of the present invention produced by copolymerizing the raw materials and at least one monomer copolymerizable with the raw materials contains N-cyclohexyl maleimide unit as a heat-resistance imparting component. Therefore, the resultant N-cyclohexyl maleimide-based resins have excellent heat resistance as shown by a glass transition temperate of not lower than 120° C.

Moreover, since the heat-resistant resins are produced using the raw materials formed by N-cyclohexyl maleimide containing 0.001 to 1 weight percent of cyclohexylamino succinic anhydride, they have a low coloring factor, and yellowness (YI) of not higher than 2, or yellowness in a solution (YIsol.) of not higher than 3, preferably not higher than 2.

In order to produce a heat-resistant resin with higher heat resistance, namely, with a glass transition temperature of not lower than 120° C., even if the ratio of the N-cyclohexyl maleimide unit is increased, the resultant heat-resistant resin can have a reduced coloring factor and excellent transparency.

Thus, by preparing a raw material containing N-cyclohexyl maleimide as a principal component and controlling the content of cyclohexylamino succinic anhydride within the range from 0.001 to 1 weight percent (based on N-cyclohexyl maleimide), it is possible to reduce the coloration of the heat-resistant resins produced from the raw material.

Moreover, since the heat-resistant resins produced from the above-mentioned raw material has excellent transparency and heat resistance, and a lower coloring factor, it is suitably used in various fields, such as automobile parts, electrical equipment parts, face plates, signs, covers for lights, ornaments, and variety goods.

EXAMPLE 4

15.75 parts of methyl methacrylate, 6.25 parts of N-cyclohexyl maleimide (a), 25 parts of toluene, and 0.0025 parts of pentaerythrityl-tetrakis[3-(3,5-di-t-butyl-4-hydroxyphenyl)propionate] were placed in the polymerizing tank described in Example 1.

On the other hand, a first mixed solution containing 15.75 parts of methyl methacrylate, 6 parts of styrene and 10 parts of toluene was placed in the first dropping vessel, and the dissolved oxygen was removed from the first mixed solution by performing bubbling with nitrogen gas in advance. Moreover, a second mixed solution containing 6.25 parts of the N-cyclohexyl maleimide (a) and 10 parts of toluene was placed in the second dropping vessel, and the dissolved oxygen was removed from the second mixed solution by performing bubbling with nitrogen gas in advance. Furthermore, a third mixed solution containing 0.108 parts of t-butyl peroxy isopropyl carbonate and 5 parts of toluene was placed in the third dropping vessel, and the dissolved oxygen was removed from the third mixed solution by performing bubbling with nitrogen gas in advance.

Bubbling of the solution in the polymerizing tank using nitrogen gas was performed for 10 minutes while agitating the solution at 300 rpm so as to remove the dissolved oxygen from the solution by nitrogen gas substitution. Thereafter, heating of the solution was initiated under the atmosphere of nitrogen gas. When the solution reached 110° C., 0.02 parts of t-butyl peroxy isopropyl carbonate as a polymerization initiator was added to the solution.

Subsequently, the first, second and third mixed solutions were dropped into the solution in the polymerizing tank from the first, second and third dropping vessels, respectively, over 3.5 hours, and a polymerization was performed under refluxing at a polymerization temperature of 110° C. for 7 hours. Thereafter, 0.0475 parts of the above-mentioned stabilizer was added to the solution in the polymerizing tank.

The polymeric liquid containing the copolymer in the polymerizing tank was supplied to a 30-mm twin screw extruder with a vent port and cylinder temperature being controlled at 240° C., and the solvent in the polymeric liquid was removed under vacuum through the vent port. The strand of the polymer from the vent port was made into a pellet to produce a polymer (4) as a heat-resistant resin of the present invention.

The N-cyclohexyl maleimide (a) used in Example 4 was used immediately after being purified by distillation. The YIsol. of the N-cyclohexyl maleimide (a) was 0.1 when measured by the above-mentioned measuring method. Moreover, the YIsol. of all of other raw materials, like the methyl methacrylate, etc. was not higher than 0.1.

The physical properties of the polymer (4) were measured according to the above-mentioned measuring methods. The YIsol. and glass transition temperature of the polymer (4) were 3.1 and 136° C., respectively. The results are shown in Table 1.

TABLE 1

|  | YIsol. of raw material CHMI (—) | YIsol. of polymer (—) | Glass transition temperature (° C.) |
|---|---|---|---|
| Example 4 | 0.1 | 3.1 | 136 |
| Example 5 | 0.2 | 3.2 | 135 |
| Comparative Example 4 | 1.1 | 4.4 | 136 |
| Comparative Example 5 | 1.5 | 5.9 | 136 |

CHMI is N-cyclohexyl maleimide

EXAMPLE 5

N-cyclohexyl maleimide (b) having YIsol of 0.2 was prepared by the accelerated heating test as shown in FIG. 1. A polymer (5) of Example 5 was produced in the same manner as in Example 4 except that the N-cyclohexyl maleimide (b) was used instead of the N-cyclohexyl maleimide (a) with YIsol. of 0.1 of Example 4.

The physical properties of the polymer (5) were measured according to the above-mentioned measuring methods. The YIsol. and glass transition temperature of the polymer (5) were 3.2 and 135° C., respectively. The results are shown in Table 1.

In the accelerated heating test, the N-cyclohexyl maleimide which was just produced was left at rest in an oven at 86° C., and the YIsol. of the N-cyclohexyl maleimide was measured with the passage of days so as to observe the coloration of the N-cyclohexyl maleimide. Then, N-cyclohexyl maleimides having varying YIsol. were produced.

Next, in order to explain the effect of the production process of the present invention, the following description will explain Comparative Examples.

COMPARATIVE EXAMPLE 5

N-cyclohexyl maleimide (c) was prepared by leaving the N-cyclohexyl maleimide, which was just purified by distillation, under atmosphere of oxygen at 86° C. for 8 days. A comparative polymer (5) of Comparative Example 5 was prepared in the same manner as in Example 4 except that the N-cyclohexyl maleimide (c) was used. The YIsol. of the N-cyclohexyl maleimide (c) was 1.1 according to the measuring method.

The physical properties of the comparative polymer (5) were measured according to the above-mentioned measuring methods. The YIsol. and glass transition temperature of the comparative polymer (5) were 4.4 and 136° C., respectively. The results are shown in Table 1.

COMPARATIVE EXAMPLE 6

N-cyclohexyl maleimide (d) was prepared by leaving the N-cyclohexyl maleimide, which was just purified by distillation, under natural light for 4 days. A comparative polymer (6) of Comparative Example 6 was prepared in the same manner as in Example 4 except that the N-cyclohexyl maleimide (d) was used. The YIsol. of the N-cyclohexyl maleimide (d) was 1.5 according to the measuring method.

The physical properties of the comparative polymer (6) were measured according to the above-mentioned measuring methods. The YIsol. and glass transition temperature of the comparative polymer (6) were 5.9 and 136° C., respectively. The results are shown in Table 1.

It is clear from Examples 4 and 5 and Comparative Examples 5 and 6 that the process for producing heat-resistant resins of the present invention can stably produce a heat-resistant resin which contains a large amount of monomer units of N-cyclohexyl maleimide, for example, 20 to 30 percent, based on the sum of the whole monomer units required for producing the heat-resistant resin, and has excellent heat resistance as indicated by a glass transition temperature of not lower than 120° C.

Moreover, in this production process, even when the amount of N-cyclohexyl maleimide by monomer unit is increased, if N-cyclohexyl maleimide whose YIsol. is not higher than 1.0 is used, it is possible to cause the YIsol. of the polymer as the resultant heat-resistant resin not to be higher than 4, and stably produce heat-resistant resins having a reduced coloring factor and excellent transparency.

Since such a heat-resistant resin is excellent in its transparency and heat resistance, it is suitable for use as parts which are often brought into high temperature states around 100° C., like automobile parts and electrical equipment parts.

EXAMPLE 6

A reaction solution (1) was prepared by adding 0.4 parts of octadecyl isocyanate [$CH_3(CH_2)_{17}NCO$] as a compound (c) to 20 parts of N-cyclohexyl maleimide and 80 parts of toluene, and performing a reaction under the atmosphere of nitrogen at 100° C. for 15 hours while agitating the solution.

Next, 15.75 parts of methyl methacrylate, 31.25 parts of the reaction solution (1) were placed in a two-liter polymerizing tank having first and second dropping vessels and an agitator. Bubbling was performed for 10 minutes using nitrogen gas while agitating the solution at 300 rpm. After the nitrogen gas substitution, heating of the solution was initiated under the atmosphere of nitrogen gas.

On the other hand, 15.75 parts of methyl methacrylate and 6 parts of styrene were placed in the first dropping vessel, and bubbling was performed using nitrogen gas in advance. 31.25 parts of the reaction solution (1) and 0.108 parts of t-butyl peroxy isopropyl carbonate were placed in the second dropping vessel, and bubbling was performed using nitrogen gas in advance.

Subsequently, when the solution reached 110° C., 0.02 parts of t-butyl peroxy isopropyl carbonate was added to the solution. Thereafter, the solutions were dropped into the solution in the polymerizing tank from the first and second dropping vessels, respectively, over 3.5 hours, and a polymerization was performed under refluxing at a polymerization temperature of 110° C. for 7 hours. Moreover, 0.05 parts of pentaerythrityl-tetrakis[3-(3,5-di-t-butyl-4-hydroxyphenyl) propionate] was added to obtain a polymeric liquid (1).

A part of the polymeric liquid (1) was dissolved in methyl ethyl ketone, and the resultant solution was put into methyl alcohol. By separating the polymeric liquid (1) in methyl alcohol, a copolymer (6) as a heat-resistant resin of the present invention was obtained.

With the use of the separated product, the glass transition temperature of the copolymer (6) was measured. The glass transition temperature was 134° C.

On the other hand, a compound (d) which was produced by the reaction of the non-radical polymerizable compound (b) as an impurity in N-cyclohexyl maleimide and octadecyl isocyanate as the compound (c) was isolated from the polymeric liquid (1) using a GPC column. The melting point and the loss in weight during heating at 260° C. which is the ordinary molding temperature of the compound (d) were measured. The melting point and the loss in weight of the compound (d) were 270° C. and 17 percent, respectively.

① Measurement of Melting Point and Loss in Weight During Heating

The melting point and loss in weight during heating of the test specimen were measured from the thermogravimetric analysis-differential thermal analysis (TG-DTA) curve measured by a thermal analyzer (TG8110 of Rigaku Denki K. K.) using α-alumina as a reference under the atmosphere of nitrogen gas from room temperature to 500° C. at a heating rate of 10° C./minute.

COMPARATIVE EXAMPLE 7

A comparative polymeric liquid (1) was prepared in the same manner as in Example 1 except that the addition of octadecyl isocyanate in Example 6 was omitted. A comparative copolymer (7) was separated from the comparative polymeric liquid (1) in the same manner as in Example 6, and the glass transition temperature of the comparative copolymer (7) was measured. The glass temperature was 135° C.

A non-radical polymerizable compound (b) (which was identified as CASA) as an impurity in the N-cyclohexyl maleimide was isolated from the comparative polymeric liquid (1) using the GPC column. The melting point and the loss in weight during heating at 260° C. of the non-radical polymerizable compound (b) were measured. The melting point and the loss in weight were 157° C., and 88 percent, respectively.

Next, the polymeric liquid (1) of Example 6 and the comparative polymeric liquid (1) of Comparative Example 7 were respectively supplied to extruders having a vent port and cylinder temperature being controlled in a range from 250 to 260° C., and the solvent in the polymeric liquid (1) was removed under vacuum through the respective vent ports so as to remove the solvent, etc. As a result, a copolymer pellet (6) as a heat-resistant resin of the present invention and a comparative copolymer pellet (7) were obtained.

In the production of the copolymer pellet (6) and comparative copolymer pellet (7), when the polymeric liquid (1) was used, the adhesion of the non-radical polymerizable compound (b) as an impurity to a reducing line used for removing the solvent and the outlet for taking out the copolymer was not observed. However, when the comparative polymeric liquid (1) was used, the non-radical polymerizable compound (b) adhered as gum to the reducing line and the outlet for taking out the copolymer.

Subsequently, molded articles were produced from the copolymer pellet (6) and the comparative copolymer pellet (7), respectively. The molded article produced from the copolymer pellet (7) had excellent surface smoothness, and fine appearance and transparency. On the other hand, the comparative copolymer pellet (7) had poor surface smoothness, appearance and transparency compared to the molded article produced from the copolymer pellet (6).

It is thus clear from Example 6 and Comparative Example 7 that since the heat-resistant resin of the present invention contains N-cyclohexyl maleimide in an amount as large as 25 percent, i.e., of not lower than 20 percent, based on the total of the monomer mixture, it has excellent heat resistance as shown by a glass transition temperature of not lower than 130° C.

In the production process of the present invention, it is clear from the results of Example 6 and Comparative Example 7 that, by adding a small amount, i.e., 2 percent, of octadecyl isocyanate to the N-cyclohexyl maleimide, it is possible to reduce the volatilization of impurities caused by the N-cyclohexyl maleimide, contained in the resultant heat-resistant resin, while retaining the heat resistance.

Therefore, in the structure and process of the present invention, it is possible to prevent the production of the heat-resistant resin from becoming unstable due to the separation and adhesion of the impurities caused by volatilization in the solvent removing step and a lowering of the surface smoothness of a molded article produced by molding the heat-resistant resin due to the volatilization of the impurities, thereby achieving stable production of molded article having excellent heat resistance, transparency and appearance.

Moreover, in the production process of the present invention, by using a simple step of only adding a small amount of octadecyl isocyanate during the production, it is possible to easily and stably produce heat-resistance resins having the above-mentioned excellent properties without purification of a raw material containing N-cyclohexyl maleimide as a principal component, complicated process control, etc., which are required in prior arts.

EXAMPLE 7

15.75 parts of methyl methacrylate, 6.25 parts of N-cyclohexyl maleimide, 25 parts of toluene, and 0.0025 parts of pentaerythrityl-tetrakis[3-(3,5-di-t-butyl-4-hydroxyphenyl)propionate] as a hindered phenol-based antioxidant were placed in the polymerizing tank described in Example 1. After bubbling the mixture with nitrogen gas for 10 minutes while agitating the mixture at 300 rpm, heating of the mixture was initiated under the atmosphere of nitrogen gas.

On the other hand, 15.75 parts of methyl methacrylate, 6 parts of styrene and 10 parts of toluene were placed in the first dropping vessel, and the mixture was bubbled with nitrogen gas in advance. Moreover, 6.25 parts of N-cyclohexyl maleimide and 10 parts of toluene were placed in the second dropping vessel, and the mixture was bubbled with nitrogen gas in advance. Furthermore, 0.108 parts of t-butyl peroxy isopropyl carbonate as the initiator and 10 parts of toluene were placed in the third dropping vessel, and the mixture was bubbled with nitrogen gas in advance.

When the temperature in the polymerizing tank reached 110° C., 0.02 parts of t-butyl peroxy isopropyl carbonate was added to the polymerizing tank. Subsequently, dropping of the mixtures into the polymerizing tank from the first, second and third dropping vessels, respectively, was initiated. A polymerization was performed under refluxing at a polymerization temperature of 110° C. for 7 hours while dropping the mixtures from the first, second and third dropping vessels over 3.5 hours.

After the completion of the polymerization, 0.0475 parts of pentaerythrityl-tetrakis[3-(3,5-di-t-butyl-4-hydroxyphenyl)propionate] was added so as to obtain a polymeric liquid. The conversion rate of monomer to polymer was measured from the resultant polymeric liquid by gas chromatography. The conversion rate was 96.4 percent.

The polymeric liquid was supplied to a 30-mm twin screw extruder with a vent port and cylinder temperature being controlled at 240° C., and the solvent in the polymeric liquid was removed under vacuum through the vent port. The strand from the vent port was made into a pellet to produce a copolymer pellet (7) as a heat-resistant resin of the present invention. The yellowness (YIsol.) of the copolymer pellet (7) in a solution was 3.1, and the glass transition temperature thereof was 136° C. The major reaction conditions and results are shown in Table 2.

TABLE 2

|  | Example 7 | Example 8 | Example 9 |
|---|---|---|---|
| Hindered phenol-based stabilizer |  |  |  |
| Amount added before polymerization (part) | 0.0025 | 0.0025 | 0.0025 |
| Amount added after polymerization (part) | 0.0475 | 0.0275 | 0.0275 |
| Phosphorus-based antioxidant |  |  |  |
| Amount added before polymerization (part) | — | — | 0.005 |
| Amount added after polymerization (part) | — | — | 0.055 |
| Conversion of monomer (%) | 96.4 | 95.2 | 95.5 |
| Yellowness (YIsol.) | 3.1 | 2.8 | 2.2 |
| Glass transition temperature (° C.) | 136 | 136 | 135 |

EXAMPLE 8

The same reaction was preformed in the same manner as in Example 7 except that the amount of pentaerythrityl-tetrakis[3-(3,5-di-t-butyl-4-hydroxyphenyl)propionate] added after the completion of the polymerization was changed from 0.0475 parts to 0.0275 parts. As a result, a polymeric liquid was obtained. The conversion rate of monomer to polymer was measured from the resultant polymeric liquid by gas chromatography. The conversion rate was 95.2 percent.

The polymeric liquid was supplied to a 30-mm twin screw extruder with a vented port and cylinder temperature being controlled at 240° C., and the solvent in the polymeric liquid was removed under vacuum through the vent port. The strand from the vent port was made into a pellet to produce a copolymer pellet (8) as a heat-resistant resin of the present invention. The yellowness (YIsol.) of the copolymer pellet (8) in a solution was 2.8, and the glass transition temperature thereof was 136° C. The major reaction conditions and results are shown in Table 2.

EXAMPLE 9

15.75 parts of methyl methacrylate, 6.25 parts of N-cyclohexyl maleimide, 25 parts of toluene, 0.0025 parts of pentaerythrityl-tetrakis[3-(3,5-di-t-butyl-4-hydroxyphenyl)propionate], and 0.005 parts of di( 2,4-di-t-butylphenyl)pentaerythritol diphosphite as a phosphorous-based antioxidant were placed in the polymerizing tank described in Example 1. Then, a polymerization was performed in the same manner as in Example 7.

After the completion of the polymerization, 0.0275 parts of pentaerythrityl-tetrakis[3-(3,5-di-t-butyl-4-hydroxyphenyl)propionate] and 0.055 parts of di(2,4-di-t-butylphenyl)pentaerythritol diphosphite were added so as to obtain a polymeric liquid. The conversion rate of monomer to polymer was measured from the resultant polymeric liquid by gas chromatography. The conversion rate was 95.5 percent.

The polymeric liquid was supplied to a 30-mm twin screw extruder with a vent port and cylinder temperature being controlled at 240° C., and the solvent in the polymeric liquid was removed under vacuum through the vent port. The strand from the vent port was made into a pellet to produce a copolymer pellet (9) as a heat-resistant resin of the present invention. The yellowness (YIsol.) of the copolymer pellet (9) in a solution was 2.2, and the glass transition temperature thereof was 135° C. The major reaction conditions and results are shown in Table 2.

COMPARATIVE EXAMPLE 8

15.75 parts of methyl methacrylate, 6.25 parts of N-cyclohexyl maleimide, and 25 parts of toluene were placed in the polymerizing tank described in Example 1. After bubbling the mixture with nitrogen gas for 10 minutes while agitating the mixture at 300 rpm, heating of the mixture was initiated under the atmosphere of nitrogen.

On the other hand, 15.75 parts of methyl methacrylate, 6 parts of styrene and 10 parts of toluene were placed in the first dropping vessel, and the mixture was bubbled with nitrogen gas in advance. Moreover, 6.25 parts of N-cyclohexyl maleimide and 10 parts of toluene were placed in the second dropping vessel, and the mixture was bubbled with nitrogen gas in advance. Furthermore, 0.108 parts of t-butyl peroxy isopropyl carbonate and 10 parts of toluene were placed in the third dropping vessel, and the mixture was bubbled with nitrogen gas in advance.

When the temperature in the polymerizing tank reached 110° C., 0.02 parts of t-butyl peroxy isopropyl carbonate was added to the polymerizing tank. subsequently, dropping of the mixtures into the polymerizing tank from the first, second and third dropping vessels, respectively, was initiated. A polymerization was performed under refluxing at a polymerization temperature of 110° C. for 7 hours while dropping the mixtures from the first, second and third dropping vessels over 3.5 hours. As a result, a polymeric liquid was obtained.

The conversion rate of monomer to polymer was measured from the resultant polymeric liquid by gas chromatography. The conversion rate was 95.4 percent. The polymeric liquid was supplied to a 30-mm twin screw extruder with a vent port and cylinder temperature being controlled at 240° C., and the solvent in the polymeric liquid was removed under vacuum through the vent port. The strand from the vent port was made into a pellet to produce a comparative copolymer pellet (8). The yellowness (YIsol.) of the comparative copolymer pellet (8) in a solution was 5.0, and the glass transition temperature thereof was 136° C. The major reaction conditions and results are shown in Table 3.

COMPARATIVE EXAMPLE 9

The same reaction was preformed in the same manner as in Example 7 except that pentaerythrityl-tetrakis[3-(3,5-di-t-butyl-4-hydroxyphenyl)propionate] was not added after the completion of the polymerization. As a result polymeric liquid was obtained. The conversion rate of monomer to polymer was measured from the resultant polymeric liquid by gas chromatography. The conversion rate was 95.1 percent.

The polymeric liquid was supplied to a 30-mm twin screw extruder with a vent port and cylinder temperature being controlled at 240° C., and the solvent in the polymeric liquid was removed under vacuum through the vent port. The strand from the vent port was made into a pellet to produce a comparative copolymer pellet (9). The yellowness (YIsol.) of the comparative copolymer pellet (9) in a solution was 4.2, and the glass transition temperature thereof was 136° C. The major reaction conditions and results are shown in Table 3.

COMPARATIVE EXAMPLE 10

The same reaction was preformed in the same manner as in Example 7 except that the amount of pentaerythrityl-tetrakis[3-(3,5-di-t-butyl-4-hydroxyphenyl)propionate] placed in the polymerizing tank before performing a polymerization was changed from 0.0025 parts to 0.05 parts. As a result, polymeric liquid was obtained. The conversion rate of monomer to polymer was measured from the resultant polymeric liquid by gas chromatography. The conversion rate was 92.4 percent.

The polymeric liquid was supplied to a 30-mm twin screw extruder with a vent port and cylinder temperature being controlled at 240° C., and the solvent in the polymeric liquid was removed under vacuum through the vent port. The strand from the vent port was made into a pellet to produce a comparative copolymer pellet (10).

The yellowness (YIsol.) of the comparative copolymer pellet (10) in a solution was 4.1, and the glass transition temperature thereof was 136° C. The major reaction conditions and results are shown in Table 3.

TABLE 3

|  | Comparative Example 8 | Comparative Example 9 | Comparative Example 10 |
| --- | --- | --- | --- |
| Hindered phenol-based stabilizer | | | |
| Amount added before polymerization (part) | — | 0.0025 | 0.05 |
| Amount added after polymerization (part) | — | — | — |
| Phosphorus-based antioxidant | | | |
| Amount added before polymerization (part) | — | — | — |
| Amount added after polymerization (part) | — | — | — |
| Conversion of monomer (%) | 95.4 | 95.1 | 92.4 |
| Yellowness (YIsol.) | 5.0 | 4.2 | 4.1 |
| Glass transition temperature (° C.) | 136 | 136 | 136 |

Each amount indicated in Table 3 is an amount added based on 50 parts of monomer mixture, the hindered phenol based antioxidant is pentaerythrityl-tetrakis[3-(3,5-di-t-butyl-4-hydroxyphenyl) propionate], and the phosphorus-based antioxidant is di(2,4-di-t-butylphenyl)pentaerythritol diphosphite.

It is clear from the results of Examples 7 to 9 shown in Table 2, and the results of Comparative Examples 8 to 10 that by dividing the amount of hindered phenol-based antioxidant and separately adding each division during the production, the heat-resistant resin produced by the production process of the present invention not only has a high glass transition temperature and excellent heat resistance, but also has a high conversion rate of monomer because the interference of the polymerization of the monomer mixture (monomer components) is prevented, and low yellowness in a solution (YIsol.).

Consequently, in this production process, it is possible to sufficiently reduce the coloration of the heat-resistant resin in the heating step performed after the polymerization of the monomer mixture, for example, the solvent removing step or molding step, thereby achieving efficient production of heat-resistant resins with a low coloring factor.

Since the heat-resistant resins produced by the above-mentioned production process have a low coloring factor, they are particularly suitable for use as material of products which require not only transparency but also beautiful appearance, such as a base of optical material like optical disks, automobile parts, covers for lights, and electrical equipment parts.

Moreover, in this production process, by using a phenol-based antioxidant and a phosphorous-based antioxidant together as the antioxidant, the coloration of the resultant heat-resistant resins can further be reduced.

EXAMPLE 10

15.75 parts of methyl methacrylate, 6.25 parts of N-cyclohexyl maleimide, 1.5 parts of cyclohexanol, 23.5 parts of toluene, and 0.0025 parts of pentaerythrityl-tetrakis[3-(3,5-di-t-butyl-4-hydroxyphenyl)propionate] as an antioxidant were placed in the polymerizing tank described in Example 1. After bubbling the mixture with nitrogen gas for 10 minutes while agitating the mixture at 300 rpm, heating of the mixture was initiated under the atmosphere of nitrogen gas.

On the other hand, 15.75 parts of methyl methacrylate, 6 parts of styrene and 10 parts of toluene were placed in the first dropping vessel, and the mixture was bubbled with nitrogen gas in advance. Moreover, 6.25 parts of N-cyclohexyl maleimide and 10 parts of toluene were placed in the second dropping vessel, and the mixture was bubbled with nitrogen gas in advance. Furthermore, 0.108 parts of t-butyl peroxy isopropyl carbonate and 10 parts of toluene were placed in the third dropping vessel, and the mixture was bubbled with nitrogen gas in advance.

When the temperature in the polymerizing tank reached 110° C., 0.02 parts of t-butyl peroxy isopropyl carbonate was added to the polymerizing tank. Subsequently, dropping of the mixtures into the polymerizing tank from the first, second and third dropping vessels, respectively, was initiated. A polymerization was performed under refluxing at a polymerization temperature of 110° C. for 7 hours while dropping the mixtures from the first, second and third dropping vessels over 3.5 hours.

After the completion of the polymerization, 0.0475 parts of pentaerythrityl-tetrakis[3-(3,5-di-t-butyl-4-hydroxyphenyl)propionate] was added. As a result, a polymeric liquid was obtained.

The polymeric liquid was supplied to a 30-mm twin screw extruder with a vent port and cylinder temperature being controlled at 240° C., and the solvent in the polymeric liquid was removed under vacuum through the vent port to distill off the solvent, etc. The strand from the vent port was made into a pellet to produce a copolymer pellet (10) as a heat-resistant resin of the present invention.

The yellowness (YIsol.) of the copolymer pellet (10) in a solution was 2.0, the glass transition temperature thereof was 135° C., and the weight-average molecular weight was 160000. The solvent, etc, distilled off from the vent port of the extruder were recovered, and the composition of the recovered liquid was measured by a predetermined method using gas chromatography. The recovered liquid contained 97.1 percent of toluene, 2.7 percent of cyclohexanol, and 0.2 percent of methyl methacrylate.

EXAMPLE 11

The same reaction was performed in the same manner as in Example 10 except that benzyl alcohol was used instead of cyclohexanol. As a result, a copolymer pellet (11) was obtained.

The yellowness (YIsol.) of the copolymer pellet (11) in a solution was 1.7, the glass transition temperature thereof was 133° C., and the weight-average molecular weight was 150000. The composition of the recovered liquid distilled off from the extruder contained 97.6 percent of toluene, 2.1 percent of benzyl alcohol, and 0.3 percent of methyl methacrylate.

EXAMPLE 12

15.75 parts of methyl methacrylate, 6.25 parts of N-cyclohexyl maleimide, 23.5 parts of toluene, and 0.0025 parts of pentaerythrityl-tetrakis[3-(3,5-di-t-butyl-4-hydroxyphenyl)propionate] were placed in the polymerizing tank described in Example 1. After bubbling the mixture with nitrogen gas for 10 minutes while agitating the mixture at 300 rpm, heating of the mixture was initiated under the atmosphere of nitrogen gas.

When the temperature in the polymerizing tank reached 110° C., 0.02 parts of t-butyl peroxy isopropyl carbonate was added to the polymerizing tank. A polymerization was performed under refluxing at a polymerization temperature of 110° C. for 7 hours while dropping the mixtures into the polymerizing tank from the first, second and third dropping vessels, respectively, in the same manner as in Example 1.

After the completion of the polymerization, 1.5 parts of cyclohexanol and 0.0475 parts of pentaerythrityl-tetrakis[3-(3,5-di-t-butyl-4-hydroxyphenyl)propionate] were added. As a result, a polymeric liquid was obtained. A copolymer pellet (12) as a heat-resistant resin of the present invention was produced from the polymeric liquid like Example 10.

The yellowness (YIsol.) of the copolymer pellet (12) in a solution was 1.9, the glass transition temperature thereof was 135° C., and the weight-average molecular weight was 180000. The composition of the recovered liquid distilled off from the extruder contained 97.1 percent of toluene, 2.7 percent of cyclohexanol, and 0.2 percent of methyl methacrylate.

EXAMPLE 13

The same reaction was performed in the same manner as in Example 10 except that the amount of cyclohexanol was changed from 1.5 parts to 5 parts, and the amount of toluene was changed from 23.5 parts to 20 parts. As a result, a copolymer pellet (13) was obtained.

The yellowness (YIsol.) of the copolymer pellet (13) in a solution was 2.1, the glass transition temperature thereof was 134° C., and the weight-average molecular weight was 180000. The composition of the recovered liquid distilled off from the extruder contained 91.3 percent of toluene, 8.2 percent of cyclohexanol, and 0.3 percent of methyl methacrylate.

EXAMPLE 14

The same reaction was performed in the same manner as in Example 10 except that the amount of cyclohexanol was changed from 1.5 parts to 0.25 parts, and the amount of toluene was changed from 23.5 parts to 24.75 parts. As a result, a copolymer pellet (14) was obtained.

The yellowness (YIsol.) of the copolymer pellet (14) in a solution was 2.7, the glass transition temperature thereof was 135° C., and the weight-average molecular weight was 180000. The composition of the recovered liquid distilled off from the extruder contained 99.6 percent of toluene, and 0.3 percent of methyl methacrylate. The amount of cyclohexanol was less than 0.1 percent which was the limit of detection, and thus cyclohexanol was not detected.

COMPARATIVE EXAMPLE 11

The same reaction was performed in the same manner as in Example 10 except that the cyclohexanol was not used, and the amount of toluene was changed from 23.5 parts to 25 parts. As a result, a comparative copolymer pellet (11) was obtained.

The yellowness (YIsol.) of the comparative copolymer pellet (11) in a solution was 3.1, and the glass transition temperature thereof was 136° C.

As is clear from Examples 10 to 14 and Comparative Example 11, in the above-mentioned processes for producing heat-resistant resins, it is possible to stably produce heat-resistant resins having excellent transparency and heat resistance, and a low coloring factor by adding an alcohol having volatility during the production.

Thus, the resultant heat-resistant resins are particularly suitable for use as material of products which require not only transparency but also beautiful appearance, such as a base of optical material like optical disks, automobile parts, covers for lights, and electrical equipment parts.

EXAMPLE 15

15.75 parts of methyl methacrylate, 6.25 parts of N-cyclohexyl maleimide, 0.05 parts of acetic anhydride, 25 parts of toluene, and 0.0025 parts of pentaerythrityl-tetrakis[3-(3,5-di-t-butyl-4-hydroxyphenyl)propionate] as an antioxidant were placed in the polymerizing tank described in Example 1. After bubbling the mixture with nitrogen gas for 10 minutes while agitating the mixture at 300 rpm, heating of the mixture was initiated under the atmosphere of nitrogen gas.

On the other hand, 15.75 parts of methyl methacrylate, 6 parts of styrene and 10 parts of toluene were placed in the first dropping vessel, and the mixture was bubbled with nitrogen gas in advance. Moreover, 6.25 parts of N-cyclohexyl maleimide and 10 parts of toluene were placed in the second dropping vessel, and the mixture was bubbled with nitrogen gas in advance. Furthermore, 0.108 parts of t-butyl peroxy isopropyl carbonate as the initiator and 10 parts of toluene were placed in the third dropping vessel, and the mixture was bubbled with nitrogen gas in advance.

When the temperature in the polymerizing tank reached 110° C., 0.02 parts of t-butyl peroxy isopropyl carbonate was added to the polymerizing tank. Subsequently, dropping of the mixtures into the polymerizing tank from the first, second and third dropping vessels, respectively, was initiated. A polymerization was performed under refluxing at a polymerization temperature of 110° C. for 7 hours while dropping the mixtures from the first, second and third dropping vessels over 3.5 hours.

After the completion of the polymerization, 0.0475 parts of pentaerythrityl-tetrakis[3-(3,5-di-t-butyl-4-hydroxyphenyl)propionate] was added. As a result, a polymeric liquid was obtained.

The polymeric liquid was supplied to a 30-mm twin screw extruder with a vent port and cylinder temperature being controlled at 240° C., and the solvent in the polymeric liquid was removed under vacuum through the vent port to distill off the solvent, etc. The strand from the vent port was made into a pellet to produce a copolymer pellet (15) as a heat-resistant resin of the present invention. The yellowness (YIsol.) of the copolymer pellet (15) in a solution was 1.4, and the glass transition temperature thereof was 134° C.

EXAMPLE 16

The same reaction was performed in the same manner as in Example 15 except that propionic anhydride was used instead of acetic anhydride. As a result, a copolymer pellet (16) was obtained. The yellowness (YIsol.) of the copolymer pellet (16) in a solution was 1.2, and the glass transition temperature thereof was 134° C.

EXAMPLE 17

15.75 parts of methyl methacrylate, 6.25 parts of N-cyclohexyl maleimide, 25 parts of toluene, and 0.0025 parts of pentaerythrityl-tetrakis[3-(3,5-di-t-butyl-4-hydroxyphenyl)propionate] were placed in the polymerizing tank described in Example 1. After bubbling the mixture with nitrogen gas for 10 minutes while agitating the mixture at 300 rpm, heating of the mixture was initiated under the atmosphere of nitrogen gas.

When the temperature in the polymerizing tank reached 110° C., 0.02 parts of t-butyl peroxy isopropyl carbonate was added to the polymerizing tank. Subsequently, a polymerization was performed under refluxing at a polymerization temperature of 110° C. for 7 hours while dropping the mixtures from the first, second and third dropping vessels, respectively, in the same manner as in Example 15.

After the completion of the polymerization, 0.05 parts of acetic anhydride and 0.0475 parts of pentaerythrityl-tetrakis[3-(3,5-di-t-butyl-4-hydroxyphenyl)propionate] were added. As a result, a polymeric liquid was obtained. A copolymer pellet (17) as a heat-resistant resin of the present invention was produced from the polymeric liquid in the same manner as in Example 15. The yellowness (YIsol.) of the copolymer pellet (17) in a solution was 2.5, and the glass transition temperature thereof was 133° C.

EXAMPLE 18

The same reaction was performed in the same manner as in Example 17 except that propionic anhydride was used instead of acetic anhydride. As a result, a copolymer pellet (18) was obtained. The yellowness (YIsol.) of the copolymer pellet (18) in a solution was 2.2, and the glass transition temperature thereof was 134° C.

COMPARATIVE EXAMPLE 12

The same reaction was performed in the same manner as in Example 15 except that acetic anhydride was not used. As a result, a comparative copolymer pellet (12) was obtained. The yellowness (YIsol.) of the comparative copolymer pellet (12) in a solution was 3.1, and the glass transition temperature thereof was 136° C.

According to the results of Examples 15 to 18 and Comparative Example 12, it is possible to stably produce heat-resistant resins having excellent transparency and heat resistance, and a low coloring factor by adding a non-radical polymerizable acid anhydride like acetic anhydride, and/or a non-radical polymerizable carboxylic acid during the production.

Thus, the resultant heat-resistant resins are particularly suitable for use as material of products which require not only transparency and heat resistance but also beautiful appearance, such as a base of optical material like optical disks, automobile parts, covers for lights, and electrical equipment parts.

INDUSTRIAL APPLICABILITY

The raw material used for producing heat-resistant resins of the present invention can reduce the coloration of heat-resistant resins produced from the raw material. Since the heat-resistant resins of the present invention produced from the above-mentioned raw material have excellent transparency and heat resistance, and a low coloring factor, they are suitably used in various fields, such as automobile parts, electrical equipment parts, face plates, signs, covers for lights, ornaments, and variety goods. The process for producing heat-resistant resins of the present invention allows simple and stable production of heat-resistant resins having the above-mentioned excellent properties.

We claim:

1. A process for producing heat-resistant resins, comprising the step of copolymerizing a maleimide monomer whose yellowness in a solution is not higher than 1.0 and a polymerizable monomer which is copolymerizable with the maleimide monomer.

2. The process according to claim 1, wherein the maleimide monomer is N-cyclohexyl maleimide.

3. The process according to claim 1 or 2, wherein the polymerizable monomer which is copolymerizable with the maleimide monomer is methacrylic ester.

4. Heat-resistant resins produced by polymerizing a monomer mixture containing a non-radical polymerizable compound (b) and a maleimide monomer (a), the heat-resistant resins containing a compound (d) whose volatility is made lower than that of the non-radical polymerizable compound (b) by means of the reaction of the compound (b) with a compound (c) which is reactive with the compound (b).

5. A process for producing heat-resistant resins, comprising the steps of:

polymerizing a monomer mixture containing a maleimide monomer (a) and a non-radical polymerizable compound (b) having a functional group; and reducing the non-radical polymerizable compound (b) by using a compound (c) having a reactive group which is reactive with the functional group during the polymerization.

6. The process according to claim 5, wherein the reactive group is at least one group selected from the group consisting of isocyanate group, epoxy group, hydroxy group, and amino group.

7. The process according to claim 5, wherein a melting point of a compound (d) produced by a reaction of the non-radical polymerizable compound (b) and the compound (c) is not lower than 200° C.

8. The process according to claim 5, wherein the non-radical polymerizable compound (b) is a byproduct produced when preparing the maleimide monomer (a).

9. A process for producing heat-resistant resins, comprising the steps of:

polymerizing radical polymerizable monomer components;

causing part of an antioxidant to coexist during the polymerization and adding remaining part of the antioxidant to the monomer components after completion of the polymerization.

10. The process according to claim 9, wherein the antioxidant is at least one antioxidant selected from the group consisting of phenal antioxidants and phosphorous antioxidants.

11. The process according to claim 9, wherein the antioxidant is a hindered phenol antioxidant.

12. The process according to claim 9, wherein the antioxidant is used in an amount ranging from 0.01 to 1 weight part in total based on 100 weight parts of the monomer components, and a weight ratio of the antioxidant which is caused to coexist during the polymerization to the antioxidant added after the completion of the polymerization is in a range from 1/99 to 99/1.

13. The process according to any one of claims 9 to 12, wherein the radical polymerizable monomer components contain a maleimide monomer.

14. The process according to any one of claims 9 to 12, wherein the radical polymerizable monomer components contain methacrylic ester.

15. A process for producing heat-resistant resins, comprising the steps of:

polymerizing radical polymerizable monomer components using a solvent containing an alcohol; and distilling off a volatile component containing the alcohol under heating and reduced pressure, and separating the volatile component.

16. A process for producing heat-resistant resins, comprising the steps of:

polymerizing radical polymerizable monomer components using a solvent;

adding an alcohol after the polymerization; and distilling off a volatile component containing the alcohol under heating and reduced pressure, and separating the volatile component.

17. The process according to claim 15 or 16, wherein the radical polymerizable monomer components contain a maleimide monomer.

18. The process according to claim 15 or 16, wherein the radical polymerizable monomer components contain methacrylic ester.

19. A process for producing heat-resistant resins, comprising the step of polymerizing monomer components containing a maleimide monomer in the presence of a non-radical polymerizable acid anhydride and/or a non-radical polymerizable carboxylic acid.

20. A process for producing heat-resistant resins, comprising the steps of:

polymerizing monomer components containing a maleimide monomer; and adding a non-radical polymerizable acid anhydride and/or a non-radical polymerizable carboxylic acid after the polymerization.

21. The process according to claim 19, wherein the monomer components containing the maleimide monomer further contain methacrylic ester.

22. A process for producing a heat-resistant resin, comprising the step of polymerizing a raw material containing N-cyclohexyl maleimide as a principal component and 0.001 to 1 weight percent of cyclohexyl amino succinic anhydride, based on the N-cyclohexyl maleimide.

23. The process according to claim 22, wherein said raw material is copolymerized with at least one monomer that is copolymerizable with the raw material.

24. The process according to claim 22, wherein the heat-resistant resin has a yellowness (YI) of not higher than 2 or a yellowness in solution (YIsol.) of not higher than 3.

* * * * *